(12) United States Patent
Sasaki et al.

(10) Patent No.: US 7,189,475 B2
(45) Date of Patent: Mar. 13, 2007

(54) LITHIUM SECONDARY BATTERY

(75) Inventors: Tsuyoshi Sasaki, Aichi (JP); Yoshio Ukyo, Aichi (JP); Hideyuki Nakano, Aichi (JP); Masao Kohzaki, Aichi (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 413 days.

(21) Appl. No.: 10/333,826

(22) PCT Filed: Jul. 24, 2001

(86) PCT No.: PCT/JP01/06388

§ 371 (c)(1),
(2), (4) Date: Jan. 24, 2003

(65) Prior Publication Data

US 2003/0124423 A1    Jul. 3, 2003

(30) Foreign Application Priority Data

Jul. 27, 2000  (JP)  ............................. 2000-226929
Jan. 10, 2001  (JP)  ................................ 2001-2612
Feb. 28, 2001  (JP)  .............................. 2001-53831
Jul. 2, 2001   (JP)  ............................. 2001-201303

(51) Int. Cl.
*H01M 4/58* (2006.01)

(52) U.S. Cl. ............................ 429/231.1; 429/231.2; 429/221; 429/224; 429/206; 429/347

(58) Field of Classification Search ............ 429/231.1, 429/221, 231.2, 224, 347, 206
See application file for complete search history.

(56) References Cited

U.S. PATENT DOCUMENTS

| | | | |
|---|---|---|---|
| 5,376,475 A | | 12/1994 | Ovshinsky |
| 5,599,435 A | * | 2/1997 | Li et al. ...................... 429/224 |
| 5,707,756 A | | 1/1998 | Inoue et al. |
| 6,528,033 B1 | * | 3/2003 | Barker et al. ............... 423/306 |
| 6,645,667 B1 | * | 11/2003 | Iwamoto et al. ......... 429/231.1 |

FOREIGN PATENT DOCUMENTS

| | | |
|---|---|---|
| JP | 5-242889 | 9/1993 |
| JP | 6-44972 | 2/1994 |
| JP | 6-60867 | 3/1994 |
| JP | 6-302320 | 10/1994 |
| JP | 7-14580 | 1/1995 |
| JP | 7-101728 | 4/1995 |
| JP | 9-171827 | 6/1997 |
| JP | 9-508490 | 8/1997 |
| JP | 10-330118 | * 12/1998 |
| JP | 11-126608 | 5/1999 |
| JP | 2000-77073 | 3/2000 |
| JP | 2000-203844 | 7/2000 |
| JP | 2000-340256 | 12/2000 |
| JP | 2001-52747 | 2/2001 |
| JP | 2001-102086 | 4/2001 |

OTHER PUBLICATIONS

Ryouji Sugano: "Denki dendou-sei sankabutsu II 1 sou-jou ganen-gata sankabutsu no kouzou, soukankei to ionic migration" Denki Kagaku Oyobi Kogyo Butsuri Kagaku, vol. 63, No. 9, pp. 778-783 Sep. 1995.

A. Robert Armstrong et al.: "Synthesis of layered LiMnO2 as an electrode for rechargeable lithium batteries" Nature, vol. 381 6, pp. 499-500 Jun. 1996.

* cited by examiner

*Primary Examiner*—Laura Weiner
(74) *Attorney, Agent, or Firm*—Oblon, Spivak, McClelland, Maier & Neustadt, P.C.

(57) ABSTRACT

The present invention provides a secondary battery which is less expensive, whose safety is extremely high, which is of large capacity as well as good cyclic characteristic, and which uses an aqueous solution for the electrolytic solution. A lithium secondary battery according to the present invention is constituted by including a positive electrode, formed by binding a positive-electrode raw-material mixture including a positive electrode active material, a negative electrode, formed by binding a negative-electrode raw-material mixture including a negative electrode active material, and an electrolytic solution, comprising an aqueous solution in which a lithium salt is dissolved, said positive electrode active material including at least one of a layered structure lithium-manganese composite oxide whose basic composition is $LiMnO_2$ and an olivine structure lithium-iron composite phosphorus oxide whose basic composition is $LiFePO_4$. The present lithium secondary battery can be used in the fields of communication appliances and information-related appliances, and as an electric source for electric automobiles and the like.

11 Claims, 11 Drawing Sheets

LITHIUM SECONDARY BATTERY

TECHNICAL FIELD

The present invention relates to a lithium secondary battery in which the dope-undope phenomenon of lithium is utilized, and particularly relates to an aqueous lithium secondary battery which includes an electrolytic solution comprising an aqueous solution.

BACKGROUND ART

Since lithium secondary batteries in which the dope-undope phenomenon of lithium is utilized exhibit high energy densities, as cellular phones, personal computers and the like have been downsized, they have been widely spread in the fields of communication appliances and information-related appliances. Moreover, in the field of automobiles as well, it has been urged to develop electric automobiles because of the environmental problems as well as the resource problems, as an electric source for electric automobiles as well, lithium secondary batteries have been investigated.

Lithium secondary batteries, which have been currently put to practical use, are generally constituted by a positive electrode which uses a lithium-transition metal composite oxide as a positive electrode active material, a negative electrode which uses a carbon material and the like as a negative electrode active material, and a nonaqueous electrolytic solution in which a lithium salt is dissolved in an organic solvent, and those which exhibit high voltages of 4 V-class make a main stream.

However, since the above-described lithium secondary batteries use nonaqueous organic solvents whose burning points are low as the electrolytic solutions, the safety matters. For example, in case of arriving at over charged states, and in case of being exposed to high temperature environments, for the purpose of securing safety, it is general to equip them with devices such as PTC elements and safety valves. However, since combustible solvents are used, in order to fully secure safety, considerable difficulties follow them about. In particular, secondary batteries as an electric source for powering automobiles and the like are big, and the amounts of used organic solvents are large, in addition thereto, it is expected to use them under severe conditions such as the service temperatures, much higher safety is required.

Moreover, when moisture is present even in a small amount in batteries, there arise various problems such as the generation of gases by means of the electrolysis reaction of water, the consumption of lithium by means of the reaction between water and lithium, the corrosion of battery constituent materials. Accordingly, in the production of lithium secondary batteries, a thoroughly dry environment is required, special equipment for completely removing moisture and a large amount of labor are needed, and this is one of the causes for pushing up the costs of batteries.

Meanwhile, in aqueous lithium secondary batteries which use aqueous solutions as the electrolytic solution, the aforementioned problems do not arise basically. Moreover, in general, since aqueous solutions are of better conductivity compared to nonaqueous solutions, the reaction resistance of batteries also decreases, and the power characteristic and rate characteristic of batteries are improved. However, since it is necessary to charge and discharge in a potential range where the electrolysis reaction of water does not occur, the aqueous lithium secondary batteries suffer from a drawback in that it is difficult, compared to nonaqueous lithium secondary batteries, to secure a large discharge capacity.

From this, in aqueous lithium secondary batteries, it is desired to use an active material which is not only stable in aqueous solutions but also can reversibly dope-undope lithium ions in a large amount in a potential range where oxygen and hydrogen are not generated by means of the electrolysis of water, namely which exhibits a large capacity.

As for aqueous lithium secondary batteries which have been conventionally investigated, there exist, for example, as disclosed in Published Japanese Translation of PCT International Publication for Patent Application No. 9-508,490, a battery which uses $LiMn_2O_4$ and the like as the positive electrode active material and $LiMn_2O_4$, $VO_2$ and so forth as the negative electrode active material, and, moreover, as disclosed in Japanese Unexamined Patent Publication (KOKAI) No. 12-77,073, a battery which uses $LiCoO_2$, $Li(Ni, Co)O_2$, $LiMn_2O_4$ and the like as the positive electrode active material and $LiV_3O_8$ and so forth as the negative electrode active material.

When the present inventors carried out various tests while paying attention to the active materials, it was found out that it is difficult for $LiCoO_2$, $Li(Ni, CO)O_2$, $LiMn_2O_4$ and the like, which are positive electrode active materials having been investigated conventionally, and for $LiV_3O_8$, $VO_2$ and so forth, which are negative electrode materials, to take out a sufficient capacity in a potential range where the electrolysis reaction of water does not occur, and that they further have a problem as well in terms of the stability in aqueous solutions. Therefore, in case of actually constituting aqueous lithium secondary batteries by using them, the capacities and cycle characteristics of the lithium secondary batteries do not become practically satisfactory ones.

DISCLOSURE OF THE INVENTION

The present invention has been done in view of the aforementioned problems, and it is an assignment, in an aqueous lithium secondary battery which uses an aqueous solution as the electrolytic solution, to discover a positive electrode active material which can take out a sufficient capacity, and moreover to provide an aqueous lithium secondary battery whose capacity is large by constituting a battery by combining an appropriate negative electrode active material therewith.

As a result of further studies on aqueous lithium secondary batteries in order to solve this assignment and a great number of experiments thereon, the present inventors arrived at discovering an active material which has a large capacity within the cell voltage ranges of aqueous lithium secondary batteries.

Namely, a lithium secondary battery according to the present invention is constituted by including a positive electrode, formed by binding a positive-electrode raw-material mixture including a positive electrode active material, a negative electrode, formed by binding a negative-electrode raw-material mixture including a negative electrode active material, and an electrolytic solution, comprising an aqueous solution in which a lithium salt is dissolved, said positive electrode active material including at least one of a layered structure lithium-manganese composite oxide whose basic composition is $LiMnO_2$ and an olivine structure lithium-iron composite phosphorus oxide whose basic composition is $LiFePO_4$.

The present inventors examined the charge-discharge behaviors of main active materials, and discovered that a lithium-manganese composite oxide, whose basic composition is LiMnO$_4$ and which has a layered structure, and an olivine structure lithium-iron composite phosphorus oxide whose basic composition is LiFePO$_4$ can, in a potential range where the oxygen generation by means of the electrolysis of water does not arise, dope-undope lithium ions in a large amount reversibly, and that they are suitable as the positive electrode active material in aqueous lithium secondary batteries. Namely, the lithium-manganese composite oxide and the lithium-iron composite phosphorus oxide, being the positive electrode active material of the lithium secondary battery according to the present invention, can, in a potential range where the oxygen generation by means of the electrolysis of water does not arise, take out a capacity sufficiently.

Here, in FIG. 1, there are illustrated the relationships between the capacities of a variety of representative lithium-transition metal composite oxides, which can be used as the positive electrode active material, and the potentials (vs. Li/Li$^+$). As it is apparent from FIG. 1, LiCoO$_2$ and LiMn$_2$O$_4$ cannot, in a potential range where the oxygen generation by means of the electrolysis of water does not arise, take out capacities so much, and Li(Ni, Co)O$_2$ as well remains at about half of the inherent capacity. Note that, in actuality, since a trace amount of Li turns into LiOH in water to dissolve therein and the electrolytic solution tends to be alkaline so that the oxygen generation potential lowers, it becomes more severe conditionally. Meanwhile, since LiMnO$_2$ and LiFePO$_4$ can, in a potential range where the oxygen generation by means of the electrolysis of water does not arise, dope-undope lithium ions in a large amount reversibly, they can take out capacities sufficiently. Therefore, it is possible to confirm that the lithium secondary battery according to the present invention which uses LiMnO$_2$ or LiFePO$_4$ as the positive electrode active material makes a secondary battery of large capacity.

Therefore, the lithium secondary battery according to the present invention makes an aqueous secondary battery which is less expensive, whose safety is extremely high, and which is of high power as well as large capacity. Moreover, although having been revealed in the subsequent experiments, it makes an aqueous secondary battery which lowers the capacity less even after repeating charge-discharge, and which is good in terms of cycle characteristic, in particular, cycle characteristic at high temperatures.

Moreover, the lithium secondary battery according to the present can desirably be embodied such that a lithium-vanadium composite oxide or transition metal chalcogenide, which is a substance having a lithium dope-undope potential lower than those of the aforementioned lithium-manganese composite oxide and lithium-iron composite phosphorus oxide, is included in the negative electrode active material. For example, among the lithium-vanadium composite oxides, it is desirable to use a lithium-vanadium composite oxide which has, in an X-ray diffraction pattern by means of CuKα ray, the highest intensity peak at 2θ=13.9°±1° (θ being diffraction angle), and in which the intensity of the peak is 5 times or more compared to the intensities of all of the other peaks.

The aforementioned lithium-vanadium composite oxide being suitable for the negative electrode active material has not been made clear at present on what space group its crystalline structure has, because the intensities of most of the peaks, which are recognizable from the X-ray diffraction pattern, are small. Therefore, the aforementioned lithium-vanadium composite oxide can only be defined such that it has the distinctive X-ray diffraction pattern as described above. As an example of the X-ray diffraction pattern, an X-ray diffraction chart of a lithium-vanadium composite oxide, used in a lithium secondary battery of a latter-described experimental example, by means of CuKα ray is illustrated in FIG. 2.

As illustrated in FIG. 2, in the X-ray diffraction chart, there is the highest intensity peak at 2θ=13.9°±1° (θ being diffraction angle), and the intensities of the other peaks, excepting the peak, are extremely low. The intensity of the highest intensity peak is an intensity of 5 times or more as much as the intensities of all of the other peaks. From this X-ray diffraction chart, it is possible to assume and judge that the present lithium-vanadium composite oxide has a crystalline structure which has a space group being strongly oriented in one direction.

On the other hand, in a lithium-vanadium composite oxide, being expressed by a composition formula LiV$_3$O$_8$, which has been investigated conventionally, an X-ray diffraction chart as illustrated in FIG. 3 is obtained. By comparing the X-ray diffraction chart of FIG. 2 to the X-ray diffraction chart of FIG. 3, the peculiarity of the crystalline structure of the present lithium-vanadium composite oxide is apparent.

It is possible to assume and judge that the fact that the present lithium-vanadium composite oxide exhibits a good characteristic as the negative electrode active material of aqueous lithium secondary batteries results from having the above-described specific crystalline structure, but, at present, the accurate reasons have not been made clear. However, according to later-described experiments, in the operating cell voltage ranges of aqueous lithium batteries, large capacities are surely obtained, this is believed that, in the present lithium-vanadium composite oxide, the constituent atoms are disposed so that they are oriented in one direction, and, resulting therefrom, the dope-undope of lithium is carried out with ease.

Further, since the charge-discharge curve shows an extremely flat curve, it is believed that the present lithium-vanadium composite oxide is one which does not undergo phase transition within the operating cell voltage ranges of aqueous lithium secondary batteries, namely one which has a crystalline structure free from accompanying phase transition. From this as well, it is possible to recognize that the present lithium-vanadium composite oxide can obtain large capacities within the operating cell voltage ranges and makes a suitable negative electrode active material. Furthermore, its charge-discharge cycle characteristic is good, it is stable with respect to aqueous electrolytic solutions, moreover, its crystalline structure is hardly broken down by repetitive charge-discharge, and it makes a negative electrode active material which can maintain the large capacities.

As for the lithium-vanadium composite oxide, in addition to the aforementioned lithium-vanadium composite oxide, it is desirable to use a spinel structure lithium-vanadium composite oxide whose basic composition is LiV$_2$O$_4$. As it will be described in detail later, when an electrode was manufactured in which the present lithium-vanadium composite oxide made an active material and a single electrode evaluation test by means of a cyclic voltamogram was carried out, it was found out that, from the obtained current-potential curve (CV curve), the present lithium-vanadium composite oxide shows a so-called 2-phase coexisting lithium dope-undope behavior which has one and only oxidation-reduction potential.

Namely, different from LiNiO$_2$ and LiCoO$_2$ in which the lattice constants and the like vary continuously with the dope-undope of lithium to vary potentials in charge-discharge, the present lithium-vanadium composite oxide shows a substantially constant potential in charge-discharge. Then, the potential of charge-discharge is at around 2.4 V (vs. Li/Li$^+$), and this potential is within a potential range where the hydrogen generation by means of the electrolysis of water does not arise. Moreover, since the rising of the peak in the obtained CV curve is steep and the polarization is less, it was found out that the reaction resistance in the oxidation-reduction reaction is small. From this, the present lithium-vanadium composite oxide can, in a potential range where the hydrogen generation by means of the electrolysis of water does not arise, dope-undope a large amount of lithium ions, and, in particular, it is possible to say that it is suitable as the negative electrode active material in aqueous lithium secondary batteries.

Therefore, the lithium secondary battery according to the present invention which is embodied to use the aforementioned lithium-vanadium composite oxide as the negative electrode active material makes a lithium secondary battery which exhibits a large capacity and whose cyclic characteristic is good.

As having described so far, in the present description, the present invention has been described as lithium secondary batteries, however, the distinctive features lie in the respective active-material raw materials which constitute the positive electrode and negative electrode. Therefore, it is possible to grasp the present invention for the every aforementioned respective active-material raw materials, for example, a lithium-manganese composite material for the positive electrode active material of lithium secondary batteries, a lithium-iron composite phosphorus oxide for the positive electrode active material of lithium secondary batteries, a lithium-vanadium composite oxide for the negative electrode active material of lithium secondary batteries, and the like.

BEST MODE FOR ENFORCING INVENTION

Figure 1:
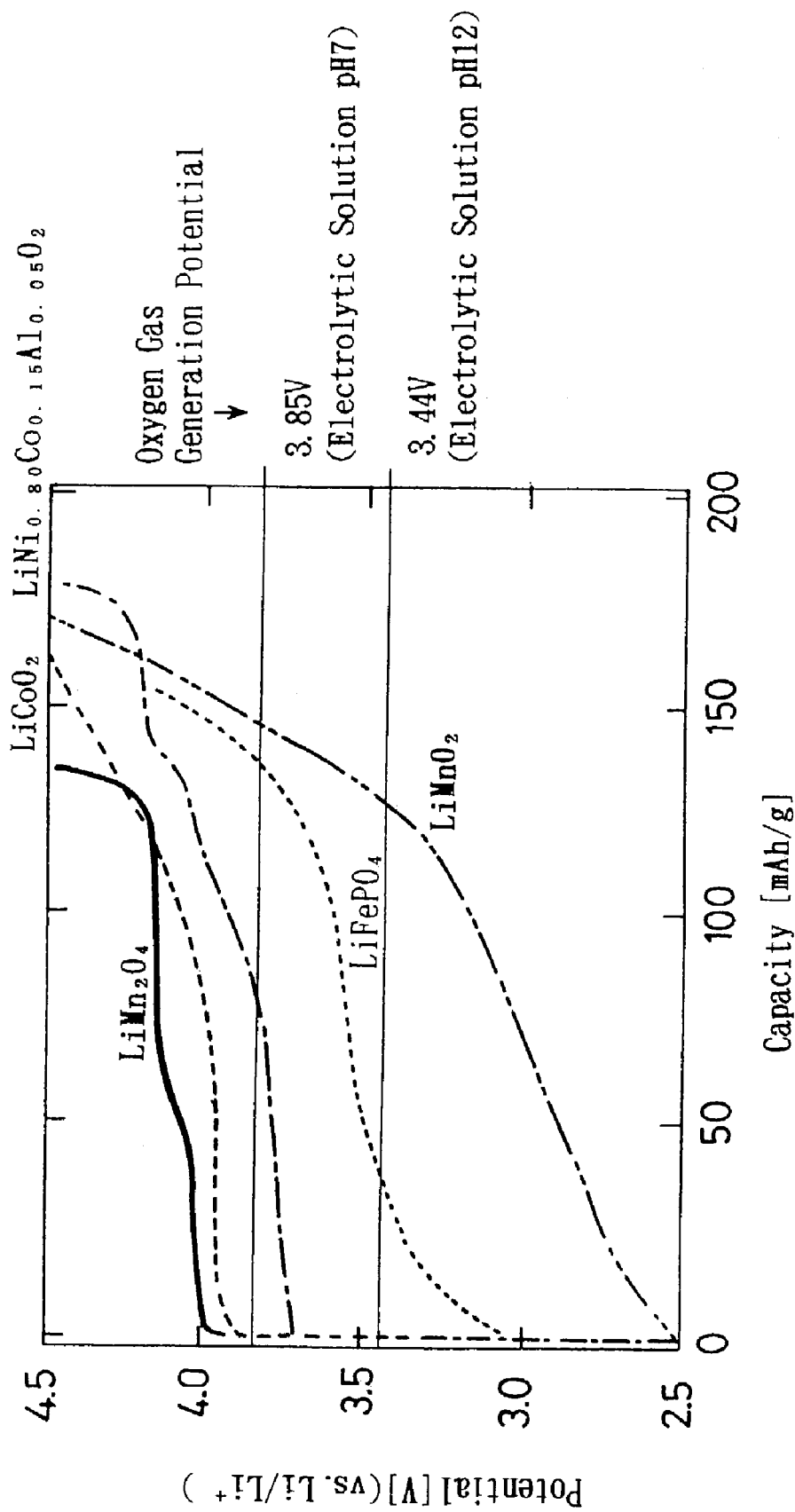
FIG. 1 illustrates the relationships between the capacities of a variety of representative lithium-transition metal composite oxides, which can be used as the positive electrode active material, and the potentials (vs. Li/Li$^+$).

Hereinafter, embodiment modes of the lithium secondary battery according to the present invention will be described for the every respective constituent elements.

<Positive Electrode Active Material>

The lithium secondary battery according to the present invention includes, as the positive electrode active material, at least one of a layered structure lithium-manganese composite oxide whose basic composition is $LiMnO_2$ and an olivine structure lithium-iron composite phosphorus oxide whose basic composition is $LiFePO_4$.

Here, the basic composition means the respective representative compositions of the lithium-manganese composite oxide and lithium-iron composite phosphorus oxide, in addition to those expressed by the aforementioned composition formulas, those compositions are included as well in which the other one or two or more atoms of Co, Ni, Al, Mg and the like, for example, substitute and so forth for part of the lithium sites, manganese sites and iron sites. Moreover, it is not necessarily limited to those with the stoichiometric compositions, and those with non-stoichiometric compositions and so on, which arise inevitably in the production, are included as well in which, for instance, cations of the atoms, such as lithium, manganese and iron, are omitted or the oxygen atoms are omitted.

Further, as for the lithium-manganese composite oxide having a layered structure, there are a lithium-manganese composite oxide (space group R3m) having a hexagonal layered structure, a so-called layered rocksalt structure, a lithium-manganese composite oxide (space group C2/m) having an orthorhombic layered structure and a lithium-manganese composite oxide (space group Pmnm) having a monoclinic zigzag layered structure, one member among them can be used independently, and, furthermore, two or more members can be mixed to use.

Among them, it is desirable to use the lithium-manganese composite oxide having a hexagonal layered rocksalt structure. The lithium-manganese composite oxide having a hexagonal layered rocksalt structure is such that, even when charge-discharge is repeated, the transformation to the spinel structure from which capacity is taken out less does not arise, and accordingly the lithium secondary battery according to the present invention which uses this as the positive electrode active material makes an aqueous secondary battery of much larger capacity.

Moreover, the lithium-iron composite phosphorus oxide is such that its crystalline structure is made into an orthorhombic olivine structure, and its space group is expressed by Pmnb. Namely, the olivine structure is a structure which is based on the hexagonal close-packed structure of oxygen, in which phosphorus is positioned at the tetrahedron sites, and in which both of lithium and iron are positioned at the octahedron sites.

The present lithium-iron composite phosphorus oxide is such that the particle diameters of its particles are not limited in particular, however, from the viewpoint of smoothly carrying out the reaction of dope-undope lithium ions to obtain a sufficient active material discharge capacity in case of doing charge-discharge at a practical charge-discharge density, it is desirable to arrange the average particle diameter of its particles to be 1 µm or less. In particular, taking the readiness of manufacturing battery and exhibiting good rate characteristic into consideration, it is desirable to arrange the average particle diameter to be from 0.2 µm or more to 0.8 µm or less.

Note that the lithium-iron composite phosphorus oxide is formed from particles which exist substantially independently. Therefore, the average particle diameter is the average value of the particle diameters of the particles which exist substantially independently, the respective particle diameters can be measured, for example, by using a scanning electron microscope (SEM) photograph on the lithium-iron composite phosphorus oxide. Namely, an SEM photograph on the lithium-iron composite phosphorus oxide is taken, the maximum diameters and minimum diameters of the lithium-iron composite phosphorus oxide particles in the photograph are measured, and the average value of those two values can be employed as the particle diameter of one particle of them.

Note that the aforementioned lithium-manganese composite oxide having a hexagonal layered rocksalt structure and lithium-iron composite phosphorus oxide having an olivine structure are such that their production methods are not limited in particular, however, in accordance with later-described production methods discovered by the present inventors, these can be produced with ease.

<Negative Electrode Active Material>

In the lithium secondary battery according to the present invention, as the negative electrode active material, substances can be used which have a lithium dope-undope potential lower than that of the aforementioned lithium-iron composite phosphorus oxide. For example, due to the reason that the potential of doing dope-undope lithium is appropriate, it is desirable to use a lithium-vanadium composite oxide, a transition metal chalcogenide, and the like.

Among them, due to the reason that stability in aqueous solutions is good, it is desirable to use the lithium-vanadium composite oxide. The lithium-vanadium composite oxide is such that the potential of doing dope-undope lithium ions reversibly is 2.2–3.0 V (vs. Li/Li$^+$), and, in case of being combined with the aforementioned lithium-iron composite phosphorus oxide to use, it can secure a voltage close to 1 V.

In particular, even by repetitive charge-discharge, since its crystalline structure is hardly broken down, and since it is possible to maintain a large capacity, it is desirable to use the lithium-vanadium composite oxide which has, in an X-ray diffraction pattern by means of CuKα ray, the highest intensity peak at 2θ=13.9°±1° (θ being diffraction angle), and in which the intensity of the peak is 5 times or more compared to the intensities of all of the other peaks.

The lithium-vanadium composite oxide is such that its composition is not limited in particular, however, it can desirably be one which is expressed by a composition formula Li$_x$V$_3$O$_y$ (1.2<x<1.6; 7.5≦y≦8.25). Those with this composition have merits in that the aforementioned specific crystalline structure can be readily obtained.

Describing the meaning of the composition range in detail, compared to those with the aforementioned suitable range, in case of x≦1.2, the orientation in one direction in the crystalline structure lowers, and, moreover, in case of x≧1.6, impurities generate to bring about the lowering of battery capacity.

Commenting on the value of y, compared to those with the aforementioned suitable range, in case of y<7.5, the capacity lowering, resulting from the defects in the crystalline structure, is likely to occur, and, moreover, in case of y>8.25, the probability of transformation into another crystalline structures enlarges.

The lithium-vanadium composite oxide having the aforementioned composition is such that its production method is not limited in particular, however, in accordance with a later-described production method, the lithium-vanadium composite oxide having the aforementioned composition can be produced with ease.

Moreover, as described above, from the viewpoint of showing a substantially constant potential in charge-discharge and being able to reversibly dope-undope a large amount of lithium ions in a potential range where the hydrogen generation by means of the electrolysis of water does not arise, it is desirable to use a spinel structure lithium-vanadium composite oxide whose basic composition is LiV$_2$O$_4$. Commenting repeatedly, the basic composition means the representative composition of the lithium-vanadium composite oxide. Then, it is not necessarily limited to the one with the stoichiometric composition, and those with non-stoichiometric compositions and so forth, which arise inevitably in the production, are included as well in which, for instance, cations of the atoms, such as lithium, are omitted or the oxygen atoms are omitted.

This spinel structure lithium-vanadium composite oxide is such that its production method is not limited in particular, however, in accordance with a later-described production method discovered by the present inventors, it can be produced with ease.

In addition, from the viewpoint that the potential of doing dope-undope lithium ions reversibly is 2–2.5 V (vs. Li/Li$^+$) and, in case of being combined with the aforementioned positive-electrode-active-material raw materials to use, it can secure a voltage close to 2 V, and that it can constitute a secondary battery of large capacity, it is desirable to use a transition metal chalcogenide as the negative electrode active material.

Above all, because of being less expensive and exhibiting large capacities per unit weight of active materials, it is desirable to use TiS$_2$, MoS$_2$, NbS$_2$ and VS$_2$. One member of these can be used independently, and, moreover, two members or more can be mixed to use. In particular, due to the reason that it exhibits a large capacity, it is desirable to use TiS$_2$. Note that the aforementioned respective transition metal chalcogenides are such that their production methods are not limited in particular, and they can be produced by the usually used methods.

<Positive Electrode and Negative Electrode>

Both of the positive electrode and negative electrode can be formed by mixing a conductor and a binder with the powdered respective active materials, by pressing each of them, which are made into a positive electrode raw material mixture and a negative electrode raw material mixture, onto a surface of an electricity collector, which is made of metal, or by coating and drying them thereon.

The conductor is for securing the electric conductivity of the electrodes, and, for example, one member of carbonaceous-material powdered substances, such as carbon black, acetylene black and graphite, can be used, or two or more members thereof can be mixed to use. Moreover, the binder plays a role of fastening the active material particles and the conductor particles together, and it is possible to use, for instance, a fluorine-containing resin, such as polytetrafluoroethylene, polyvinylidene fluoride and fluoroelastomer, and a thermoplastic resin, such as polypropylene and polyethylene.

<Aqueous Electrolytic Solution>

The electrolytic solution which is used in the lithium secondary battery according to the present invention is an aqueous electrolytic solution in which a lithium salt, acting as an electrolyte, is dissolved in water. The lithium salt dissociates by dissolving in water, and turns into lithium ions to exist in the electrolytic solution. In general, oxide-based active-material raw materials exist more stably in aqueous solutions of from neutrality to alkalinity. Moreover, in case of taking to furthermore activate the dope-undope reaction of lithium ion into consideration as well, it is desired that the using electrolytic solution can be from neutral to alkaline. Note that being neutral herein means that, in terms of the pH value, pH=6–8 approximately.

For example, in case of using a neutral electrolytic solution of pH=7, the hydrogen generation potential by means of the electrolysis of water is 2.62 V, and the oxygen generation potential is 3.85 V (vs. $Li/Li^+$), and in case of using an alkaline electrolytic solution of pH=14, the hydrogen generation potential is 2.21 V, and the oxygen generation potential is 3.44 V (vs. $Li/Li^+$). Namely, in case of using the neutral aqueous solution, since the oxygen generation potential by means of the electrolysis of water is high, it is possible, as described above, for the positive electrode active material to dope-undope a much more amount of lithium ions and to take out much larger capacity. Therefore, in case of making a secondary battery of much larger capacity, it is desirable to use an electrolytic solution close to the neutrality, specifically, an electrolytic solution whose pH=6–10.

Moreover, in general, aqueous solutions are, compared to nonaqueous solutions, better in terms of conductiveness, for example, a neutral aqueous solution has conductivity of 10 times or more as large as that of a nonaqueous solution, and an alkaline aqueous solution has conductivity of 100 times or more as large as that of a nonaqueous solution. Accordingly, a secondary battery which uses an aqueous solution as the electrolytic solution is, compared to a nonaqueous secondary battery, of smaller internal resistance, especially, reaction resistance, and, in case of using an alkaline aqueous solution, the internal resistance becomes much smaller. Therefore, in case of making a secondary battery of much better power characteristic and rate characteristic, it is desirable to use a strongly alkaline electrolytic solution, specifically, an electrolytic solution whose pH=10–12.

The lithium salt which is usable as the electrolyte is, as far as it dissolves in water, not limited in particular, however, considering the stability and the like of the oxide being the positive electrode active material, it is desirable to use a lithium salt which turns the electrolytic solution from neutrality to alkalinity after dissolving. Specifically, for example, it is desirable to use lithium nitrate, lithium hydroxide, lithium iodide and the like. These lithium salts can be used independently, and, moreover, two members or more of these can be used simultaneously. In particular, due to the reason that it exhibits high solubility and accordingly is of good conductiveness, in order to make a neutral electrolytic solution, it is desirable to use lithium nitrate, and, moreover, in order to make a strongly alkaline electrolytic solution, it is desirable to mix lithium nitrate and lithium hydroxide to use. Note that, due to the reason that it is possible to enhance the electric conductivity of the electrolytic solution to make the internal resistance of secondary batteries smaller, it is desired that the concentration of the lithium salt in the electrolytic solution can be the saturation concentration, or a concentration close to it.

<Other Constituent Elements etc.>

In the lithium secondary battery according to the present invention, an electrode assembly is formed by facing the aforementioned positive electrode with the aforementioned negative electrode. It is desirable to interpose a separator between the positive electrode and the negative electrode. This separator separates the positive electrode from the negative electrode and holds the electrolytic solution, and cellulose-based ones can be used therefor.

The lithium secondary battery according to the present invention is such that its shape is not limited in particular, and it is possible to make it into a variety of shapes, such as cylinder types, laminated types, coin types. In whatever case of employing any shape, it is possible to complete a lithium secondary battery by accommodating the aforementioned electrode assembly, which is formed depending on the battery shape, in a predetermined battery case, by connecting the intervals from the positive electrode electricity collector and negative electrode electricity collector to the positive electrode terminal and negative electrode terminal, which lead to the outside, with a lead and the like for collecting electricity, by impregnating the aforementioned electrolytic solution into this electrode assembly, and by enclosing it in the battery case.

<Production Methods of Respective Active Materials>

(1) Production Method of Hexagonal Layered Rocksalt Structure Lithium-Manganese Composite Oxide It has been general conventionally that the above-described lithium-manganese composite oxide having a hexagonal layered rocksalt structure is synthesized by ion-exchanging α-$NaMnO_2$, which is synthesized by a solid phase reaction method, in a nonaqueous solution, which includes lithium ions, at a temperature of 300° C. or less. However, since this method goes through the 2-stage complicated process such as the solid phase reaction method and ion-exchanging, it is disadvantageous industrially.

Moreover, there is an example of synthesizing a lithium-manganese composite oxide having an orthorhombic layered rocksalt structure by hydrothermally reacting a manganese raw material with a water soluble lithium salt in an aqueous solution which includes excessively a hydroxide of an alkaline metal other than lithium. However, the obtained lithium-manganese composite oxide was, as charge-discharge was repeated, seen to transform into a spinel structure, and, in case of using it as the active material of a nonaqueous secondary battery, it was not possible to say that the cycle characteristic of the battery was good.

The present inventors repeated experiments, and discovered a method of readily producing the lithium-manganese composite oxide having a hexagonal layered rocksalt structure. The method is constituted by including: a dispersion aqueous solution preparation step of preparing a dispersion aqueous solution by mixing manganese dioxide, making a manganese source, with a lithium hydroxide aqueous solution, making a lithium source, so that Li/Mn is from 2 or more to 10 or less by molar ratio; and a hydrothermal treatment step of heating and holding the dispersion aqueous solution at a temperature of from 120° C. or more to 250° C. or less.

Namely, the present production method differs from the conventional solid phase reaction in that the hydrothermal treatment is carried out, and is a method in which the lithium-manganese composite oxide having a hexagonal layered rocksalt structure is obtained simply by dispersing the manganese dioxide in the lithium hydroxide aqueous solution, and by heating and holding the dispersion aqueous solution. By using the manganese dioxide as a manganese source, it is possible to obtain the hexagonal layered rocksalt structure lithium-manganese composite oxide which hardly transforms into a spinel structure even after charge-discharge is repeated. Then, since it is possible for the present production method to synthesize the aimed lithium-manganese composite oxide by the 1-stage hydrothermal treatment, it makes a production method which is easy and advantageous industrially. Hereinafter, the respective steps of the present production method will be described.

(a) Dispersion Aqueous Solution Preparation Step

The dispersion aqueous solution preparation step is a step in which a dispersion aqueous solution is prepared by mixing manganese dioxide, making a manganese source, with a lithium hydroxide aqueous solution with such a ratio that Li/Mn is from 2 or more to 10 or less by molar ratio.

The mixing ratio of the manganese dioxide with the lithium hydroxide aqueous solution is arranged to be such a ratio that Li/Mn is from 2 or more to 10 or less by molar ratio. This is because, when Li/Mn is less than 2 by molar ratio, mixture phases with spinel structure lithium-manganese composite oxides are made, on the contrary, when it exceeds 10, the ratio of $Li_2MnO_3$, being an impurity, increases.

Moreover, mixing of the respective raw materials can be done so that the manganese dioxide is dispersed uniformly in the lithium hydroxide aqueous solution, and can be done by ordinary methods. For example, it is possible to name an ultrasonically dispersing method with an ultrasonic homogenizer and the like, a dispersing method by giving a high shearing force with a homogenizer and so forth, and so on.

Note that, for the manganese dioxide used in a powdery form, it is desirable to use one whose average particle diameter is from 0.1 μm or more to 20 μm or less. This is because, when the average particle diameter is less than 0.1 μm, the particle diameters of the obtained lithium-manganese composite oxides become so small that it is difficult to manufacture electrodes, when it exceeds 20 μm, the particle diameters of the lithium-manganese composite oxides become so large that it is disadvantageous for power characteristic.

(b) Hydrothermal Treatment Step

The hydrothermal treatment step is a step in which the dispersion aqueous solution, prepared in the dispersion aqueous solution preparation step, is heated and held at a temperature of from 120° C. or more to 250° C. or less. This is because, at temperatures of less than 120° C., the reaction does not proceed, on the contrary, exceeding 250° C., the costs for withstanding pressure goes up.

The heating and holding time can be a time in which the reaction can terminate completely, and it can usually be carried out for 72 hours approximately. Moreover, it is possible to carry out the hydrothermal treatment, for example, by putting the aqueous solution, obtained in the dispersion aqueous solution preparation step, in an autoclave with inside lined with Teflon, by holding it at the predetermined temperature for a predetermined time and by taking out products after cooling the temperature to around room temperature by water-cooling or cooling gradually in the container.

The thus synthesized lithium-manganese composite oxide is taken out by filtering it out of the aqueous solution, and is made into a powdered one by carrying out washing with water and drying. Note that the methods of filtering, washing with water and drying are not limited in particular, for example, specifically, it can be filtered out with a suction filtration apparatus and the like, can be washed with water by means of ultrasonic and so forth, and, moreover, after filtering similarly, can be dried with a drying furnace and so on at a temperature of from 50 to 120° C. for a period of from 60 to 180 minutes approximately.

The lithium-manganese composite oxide having a hexagonal layered rocksalt structure, which is synthesized by the present production method, is hardly transformed into a spinel structure even after charge-discharge is repeated, and a secondary battery, which uses this as the active material, lowers the capacity less even after charge-discharge is repeated, namely, it makes a battery of very good cycle characteristic.

Moreover, the lithium-manganese composite oxide having a hexagonal layered rocksalt structure, which is synthesized by the present production method, is such that its application is not limited to the positive electrode active material of aqueous lithium secondary batteries, for example, it can be used as the active material and the like of nonaqueous secondary batteries which use nonaqueous electrolytic solutions.

At present, for the positive electrode active material of nonaqueous lithium secondary batteries, being readily synthesized and being handled with relative readiness, in addition thereto, being good in terms of charge-discharge cycle characteristic, secondary batteries, which use $LiCoO_2$ as the positive electrode active material, are one of the main streams. However, since cobalt is less in view of the resource amount, the secondary batteries, which use $LiCoO_2$ as the positive electrode active material, are less likely to cope with the future mass-producing and upsizing that aim at electric sources for electric automobiles, and should inevitably be expensive extremely in view of the cost. Hence, the aforementioned lithium-manganese composite oxide, which contains manganese, being abundant as the resource and being less expensive, as a constituent element, is expected to be a useful positive electrode active material which can substitute for cobalt. Therefore, the present production method makes a method capable of readily producing the hexagonal layered rocksalt structure lithium-manganese composite oxide being a useful active material.

(2) Production Method of Olivine Structure Lithium-Iron Composite Phosphoric Acid Compound It is possible to produce the above-described lithium-iron phosphoric acid compound, for example, by a method which comprises a raw-material mixing step of obtaining a mixture by mixing raw materials, and a calcination step of calcining the mixture at a predetermined temperature. Hereinafter, the respective steps will be described.

(a) Raw-Material Mixing Step

The raw-material mixing step in the present production method of the lithium-iron composite phosphorus oxide is a step in which a mixture is obtained by mixing a lithium compound, an iron compound and a phosphorus-containing ammonium salt.

As for the lithium compound making a lithium source, it is possible to use $Li_2CO_3$, $LiOH$, $LiOH.H_2O$, $LiNO_3$, and the like. In particular, for the reason of exhibiting high reactivity, it is desirable to use $LiOH.H_2O$.

As for the iron compound making an iron source, as a compound in which the valence number of iron is divalent, it is possible to use $FeC_2O_4.2H_2O$, $FeCl_2$, and the like. In particular, for the reason of generating gas, exhibiting low corrosiveness, in the calcination, it is desirable to use $FeC_2O_4.2H_2O$.

As for the phosphorus-containing ammonium salt making a phosphorus source, it is possible to use $NH_4H_2PO_4$, $(NH_4)_2HPO_4$, $P_2O_5$, and the like. In particular, for the reason of exhibiting high reactivity, it is desirable to use $(NH_4)_2HPO_4$.

All of the aforementioned raw materials can be used in a powdery form, and mixing them can be carried out by the methods which are used in mixing ordinary powders. Specifically, for example, they can be mixed with a ball mill, a mixer, a mortar, and the like. Note that the mixing proportions of the respective raw materials can be arranged so as to conform to the compositions of the lithium-iron composite phosphorus oxides to be produced.

Moreover, in order to obtain the lithium-iron composite phosphorus oxide whose average particle diameter is 1 μm or less, it is desirable to control the average particle diameters of the aforementioned raw materials, in particular, it is desirable to use those whose average particle diameter is 1 μm or less for all of the respective raw materials.

(b) Calcination Step

The calcination step is a step in which the mixture, obtained in the raw-material mixing step, is calcined at a temperature of from 600° C. or more to 700° C. or less. In order to inhibit iron from being oxidized to trivalent, the calcination can be carried out in an inert atmosphere or in a reducing atmosphere, specifically, for example, can be carried out in an argon gas flow or a nitrogen gas flow, and the like.

The calcination temperature is arranged to be from 600° C. or more to 700° C. or less. This because, when the calcination temperature is less than 600° C., the reaction does not proceed sufficiently so that sub-phases, which are formed of other than the objective orthorhombic crystalline one, are generated so that the crystallinity of the lithium-iron composite phosphorus oxide degrades. On the contrary, it is because, exceeding 700° C., the particles of the lithium-iron composite phosphorus oxide grow so that sufficient characteristic cannot be obtained. Moreover, in case of taking the uniformity of composition into consideration, the calcination can be, after preliminarily calcining at about 350° C. for a predetermined time, carried out in the aforementioned temperature range. Note that the calcination time can be arranged to be a sufficient time for completing the calcination, and can be usually carried out for 8 hours approximately.

The lithium-iron composite phosphorus oxide is, in case of using it as the positive electrode active material of lithium secondary batteries, is generally used in a powdery form. Therefore, the one which is obtained by the calcination as aforementioned can be used for the production of batteries by carrying out pulverizing.

(3) Production Method of Lithium-Vanadium Composite Oxide Expressed by

Composition Formula $Li_xV_3O_y$ (1.2<x<1.6; 7.5≦y≦8.25)

It is possible to produce the lithium-vanadium composite oxide having the aforementioned composition, for example, by mixing a lithium compound, making a lithium source, with a vanadium compound, making a vanadium source, with a predetermined proportion, and by calcining the mixture in a predetermined atmosphere at a predetermined temperature.

As for the lithium compound making a raw material, it is possible to use $Li_2CO_3$, $LiOH$, $LiNO_3$, $Li_2SO_4$, and the like. As for the vanadium compound, it is possible to use $V_2O_5$, $NH_4VO_3$, and so forth. Note that, since $V_2O_5$ has an advantage in that it makes a much less expensive raw material, it is further desirable to select $V_2O_5$ as the vanadium compound.

In this case, the mixing proportions of the aforementioned lithium compound and the aforementioned vanadium compound are arranged to be such proportions that lithium and vanadium, included in each of them, conform to the composition ratios of the lithium-vanadium composite oxides to be obtained.

The predetermined atmosphere in the calcination means slightly oxidizing atmospheres. For example, in case of using $LiNO_3$ or $Li_2CO_3$ as the lithium compound, since it generates oxidizing gas for itself in calcination, the calcination can be carried out in an argon gas flow. Thus, it is possible to create the aforementioned predetermined atmosphere by calcining while preparing the types of flowing gas and the flow rate depending on the lithium compound and vanadium compound to be reacted.

The calcination temperature can, in case of using $V_2O_5$ as the vanadium compound, desirably be arranged to be from 600° C. to 750° C. In this temperature range, since $V_2O_5$ enhances the reactivity by dissolving so that a more homogenous lithium-vanadium composite oxide can be obtained, it is possible to calcine the lithium-vanadium composite oxide which is suitable for the negative electrode active material of the lithium secondary battery according to the present invention. Note that, due to the reason that the growth of crystalline particles is inhibited so that one having a large capacity can be obtained, the calcination temperature can further desirably be arranged to be from 600° C. to 680° C. Note that the holding time at the aforementioned calcination temperature can be arranged to be 3 hours or more approximately.

The lithium-vanadium composite oxide is, in case of using it as the negative electrode active material of lithium secondary batteries, is generally used in a powdery form. Therefore, the one which is obtained by the calcination as aforementioned can be used for the production of batteries by carrying out pulverizing.

(4) Production Method of Lithium-Vanadium Composite Oxide

Having

Spinel Structure

Lithium-vanadium composite oxides having a spinel structure have been conventionally produced by mixing lithium compounds with vanadium compounds and by calcining their mixtures at high temperatures. However, since they have been calcined at high temperatures, it has been necessary, in order to constitute secondary batteries having a practical capacity, to once pulverize the obtained lithium-vanadium composite oxides and thereafter to use ones which are further heat-treated. Therefore, from the view point of reducing the number of production steps, production cost, and the like, it is desired that the calcination is carried out at a relatively low temperature, however, in order to carry out the calcination at a low temperature, it has been necessary to carry it out in a strongly reducing atmosphere which contains hydrogen.

The present inventors repeated experiments, and discovered a method of readily producing the lithium-vanadium composite oxide having a spinel structure. The method is constituted by including: a raw-material mixing step of mixing a lithium compound, making a lithium source, a vanadium compound, making a vanadium source, and a carbon material, thereby obtaining a raw material mixture; and a calcination step of calcining said raw material mixture, thereby obtaining a lithium-vanadium composite oxide.

Since the present production method is such that the carbon material is mixed in the raw material mixture, the atmosphere is, in the calcination, turned into a reducing atmosphere by the carbon material. Namely, even in case of carrying out the calcination at a relatively low temperature, it is possible to readily produce the lithium-vanadium composite oxide having a spinel structure without using hydrogen which is difficult to handle. Moreover, in accordance with the present production method, it is possible to produce the aforementioned lithium-vanadium composite oxide by a simple method in which the respective raw material compounds are mixed with the carbon material with predetermined proportions and the raw material mixture is calcined. Hereinafter, the respective steps will be described.

(a) Raw-Material Mixing Step

The present step is a step in which a lithium compound, making a lithium source, a vanadium compound, making a vanadium source, and a carbon material are mixed, thereby obtaining a raw material mixture. As for the lithium compound, it is possible to use $Li_2CO_3$, $LiOH$, $LiNO_3$, $LiSO_4$, and the like. As for the vanadium compound, it is possible to use $V_2O_5$, $NH_4VO_3$, and so forth. Note that, since $V_2O_5$ has an advantage in that it makes a much less expensive raw material, it is further desirable to select $V_2O_5$ as the vanadium compound. In this case, the mixing proportions of the aforementioned lithium compound and the aforementioned vanadium compound are arranged to be such proportions that lithium and vanadium, included in each of them, conform to the compositions of the aiming lithium-vanadium composite oxides.

The carbon material is not limited in particular regarding its type. For example, it is possible to use by turning carbonaceous materials, like graphitic materials, such as natural graphite, nodular or fibrous artificial graphite, easily-graphitized carbon, such as coke and carbon black, difficultly-graphitized carbon, such as calcined phenolic resin, into a powdery form. Note that it is possible to independently use one member of them, or to mix two members or more to use. Among them, in case of taking the dispersibility and the like in the raw material mixture into consideration, it is desirable to use carbon black.

The mixing proportion of the carbon material can, in case of taking the entire weight of the mixture of the lithium compound and the vanadium compound as 100% by weight, desirably be arranged to be from 0.5% by weight or more to 5% by weight or less. This is because, in case of being less than 0.5% by weight, compared to those within the aforementioned suitable range, the reduction operation is effected less by the carbon material. On the contrary, exceeding 5% by weight, compared to those within the aforementioned suitable range, the mixing state in the raw material mixture is less likely to be uniform, and, moreover, in case of constituting secondary batteries, it results in lowering the capacities. The mixed carbon material is such that its part is turned into carbon dioxide and the like to disappear by calcining the raw material mixture afterward. Note that the carbon material, remaining in the lithium-vanadium composite oxide, is considered to play a role of a conductor.

All of the aforementioned respective raw materials can be used in a powdery form, and mixing them can be carried out by the methods which are used in mixing ordinary powders. Specifically, for example, they can be mixed with a ball mill, a mixer, a mortar, and the like.

(b) Calcination Step

The present step is a step in which the raw material mixture, obtained in the aforementioned raw-material mixing step, is calcined, thereby obtaining a lithium-vanadium composite oxide. The calcination temperature can desirably be arranged to be from 600° C. or more to 1,000° C. or less. This is because, when the calcination temperature is less than 600° C., the reaction does not fully proceed so that a single-phase spinel phase cannot be obtained. On the contrary, exceeding 1,000° C., it is turned in an excessively reducing state so that vanadium compounds of low oxidation numbers have been generated. In particular, in case of taking suppressing the granular growth so as to inhibit the capacity from lowering into consideration, the calcination temperature can desirably be arranged to be 800° C. or less.

As described above, in case of calcining at a relatively low temperature of 800° C. or less, it is necessary to calcine in a strongly reducing atmosphere which contains hydrogen, however, in the present production method, the atmosphere is turned into a reducing atmosphere by the carbon material in the raw material mixture during the calcination. Therefore, the calcination can be carried out in an inert gas flow, such as an argon gas. Note that the calcination time can be arranged to be a sufficient time for completing the calcination, and can usually be carried out for from 4 to 24 hours approximately.

<Permission of Other Embodiment Modes>

So far, the embodiment modes of the lithium secondary battery according to the present invention have been described, however, the above-described embodiment modes are only a few of embodiment modes, and it is possible to carry out the lithium secondary battery according to the present invention, beginning with the aforementioned embodiment modes, in various modes which are subjected to modifications and improvements based on the knowledge of a person having ordinary skill in the art.

Further, the lithium secondary battery according to the present invention can be constituted by arbitrarily selecting the positive electrode active material and negative electrode active material, respectively, from the above-described materials. For example, it is possible to employ a mode in which the hexagonal layered rocksalt structure lithium-manganese composite oxide whose basic composition is $LiMnO_2$ is made into the positive electrode active material and the lithium-vanadium composite oxide, which has, in an X-ray diffraction pattern by means of CuKα ray, the highest intensity peak at $2\theta=13.9°\pm1°$ (θ being diffraction angle), and in which the intensity of the peak is 5 times or more compared to the intensities of all of the other peaks, is made into the negative electrode active material. Furthermore, for instance, it is possible to employ a mode in which the hexagonal layered rocksalt structure lithium-manganese composite oxide whose basic composition is $LiMnO_2$ is made into the positive electrode active material and the spinel structure lithium-vanadium composite oxide whose basic composition is $LiV_2O_4$ is made into the negative electrode active material. Moreover, it is possible to employ a mode in which the olivine structure lithium-manganese composite oxide whose basic composition is $LiFePO_4$ is made into the positive electrode active material and the spinel structure lithium-vanadium composite oxide whose basic composition is $LiV_2O_4$ is made into the negative electrode active material.

EXPERIMENTAL EXAMPLES

Based on the aforementioned embodiment modes, a variety of lithium secondary batteries were manufactured in which the positive electrode active material, the negative electrode active material and the like are varied, and the respective lithium secondary batteries were assessed. Hereinafter, the manufacture of the electrodes of the lithium secondary batteries, and the assessment on the initial discharge capacities and cycle characteristics in the manufactured lithium secondary batteries will be described.

<Manufacture of Electrodes of Lithium Secondary Batteries>

(1) Manufacture of Positive Electrodes

As positive electrode active materials, a hexagonal layered rocksalt structure lithium-manganese composite oxide expressed by a composition formula $LiMnO_2$, a monoclinic zigzag layered structure lithium-manganese composite oxide expressed by a composition formula $LiMnO_2$, an olivine structure lithium-iron composite phosphorus oxide expressed by a composition formula $LiFePO_4$, and a layered rocksalt structure lithium-nickel composite oxide expressed by a compositional formula $LiNi_{0.8}Co_{0.15}Al_{0.05}O_2$ were used respectively to manufacture positive electrodes.

70 parts by weight of the aforementioned active-material raw materials were mixed with 25 parts by weight of carbon as a conductor and 5 parts by weight of polytetrafluoroethylene as a binder, thereby obtaining positive-electrode raw-material mixtures. Subsequently, 10 mg of these positive-electrode raw-material mixtures were bonded by pressing onto a mesh, which had been welded onto inside a coin cell in advance and was made of stainless, with about 0.6 ton/cm², thereby making positive electrodes. In following (a)–(d), the synthesis methods of the respective lithium composite oxides and lithium composite phosphorus oxide will be described.

(a) Synthesis of Hexagonal Layered

Rocksalt Structure Lithium-Manganese Composite Oxide

By the respective methods, the so-called hydrothermal method and solid phase method, two types of the lithium-manganese composite oxides were synthesized.

(a-1) Synthesis by Hydrothermal Method

An LiOH aqueous solution was prepared by dissolving 6.29 g of $LiOH·H_2O$ in 80 ml of water. To this LiOH aqueous solution, $MnO_2$ was added in an amount of 2.61 g (Li/Mn becomes 5 by molar ratio), and was dispersed with ultrasonic for 30 minutes, thereby preparing a dispersion aqueous solution. Subsequently, this dispersion aqueous solution was put in an autoclave, and was reacted at a temperature of 200° C. for 7 days. After the reaction, the autoclave was cooled, and the precipitates in the container were filtered, washed with water and dried at 120° C., thereby obtaining a hexagonal layered rocksalt structure lithium-manganese composite oxide. Note that the obtained lithium-manganese composite oxide was turned into a powdered one by pulverizing with a mortar.

(a-2) Synthesis by Solid Phase Method

Electrolytic manganese dioxide ($MnO_2$) and lithium carbonate ($Li_2CO_3$) were mixed by using a ball mill for 4 hours according to a stoichiometric ratio. This mixture was heated to a calcination temperature of 900° C. at a temperature increment rate of 3.33° C./min. in an oxygen gas flow, was held at the temperature for 12 hours, and was thereafter cooled gradually at a temperature decrement rate of 1° C./min. for a period of 15 hours, thereby obtaining a hexagonal layered rocksalt structure lithium-manganese composite oxide. Note that the obtained lithium-manganese composite oxide was turned into a powdered one by pulverizing with a mortar.

(b) Synthesis of Monoclinic Zigzag Layered

Structure Lithium-Manganese Composite Oxide

An LiOH aqueous solution was prepared by dissolving 2.52 g of $LiOH·H_2O$ in 80 ml of water. To this LiOH aqueous solution, instead of the $MnO_2$, $Mn_2O_3$ was added in an amount of 2.37 g (Li/Mn becomes 2 by molar ratio), and was dispersed with ultrasonic for 30 minutes, thereby preparing a dispersion aqueous solution. Subsequently, this dispersion aqueous solution was put in an autoclave, and was reacted at a temperature of 200° C. for 1 day. After the reaction, the autoclave was cooled, and the precipitates in the container were filtered, washed with water and dried at 120° C., thereby obtaining a monoclinic zigzag layered structure lithium-manganese composite oxide. Note that the obtained lithium-manganese composite oxide was turned into a powdered one by pulverizing with a mortar.

(c) Synthesis of Olivine Structure Lithium-Iron Composite Phosphorus Oxide and

Survey on Characteristic as Positive Electrode Active Material $LiOH.H_2O$, $FeC_2O_4.2H_2O$ and $(NH_4)_2HPO_4$ were mixed respectively so that Li:Fe:P was 1:1:1 by molar ratio. The mixing was carried out with an automatic mortar for 30 minutes. After preliminarily calcining this mixture at 350° C. for 5 hours, it was mixed with an automatic mortar for 30 minutes. Thereafter, it was further calcined at 650° C. in an argon gas flow for 6 hours, thereby obtaining a lithium-iron composite phosphorus oxide. Note that the obtained lithium-iron composite phosphorus oxide was turned into a powdered one by pulverizing with a mortar.

Here, an electrode was manufactured in which the present lithium-iron composite phosphorus oxide was made into the active material, and the characteristic as the positive electrode active material was surveyed by carrying out a single electrode evaluation test by means of a cyclic voltamogram. First, 70 parts by weight of the lithium-iron composite phosphorus oxide was mixed with 25 parts by weight of carbon as a conductor and 5 parts by weight of polytetrafluoroethylene as a binder, thereby obtaining an electrode raw-material mixture. Subsequently, 10 mg of this electrode raw-material mixture was bonded by pressing onto a mesh, made of stainless, with a pressure of about 0.6 ton/cm$^2$, thereby making an electrode.

Figure 4:
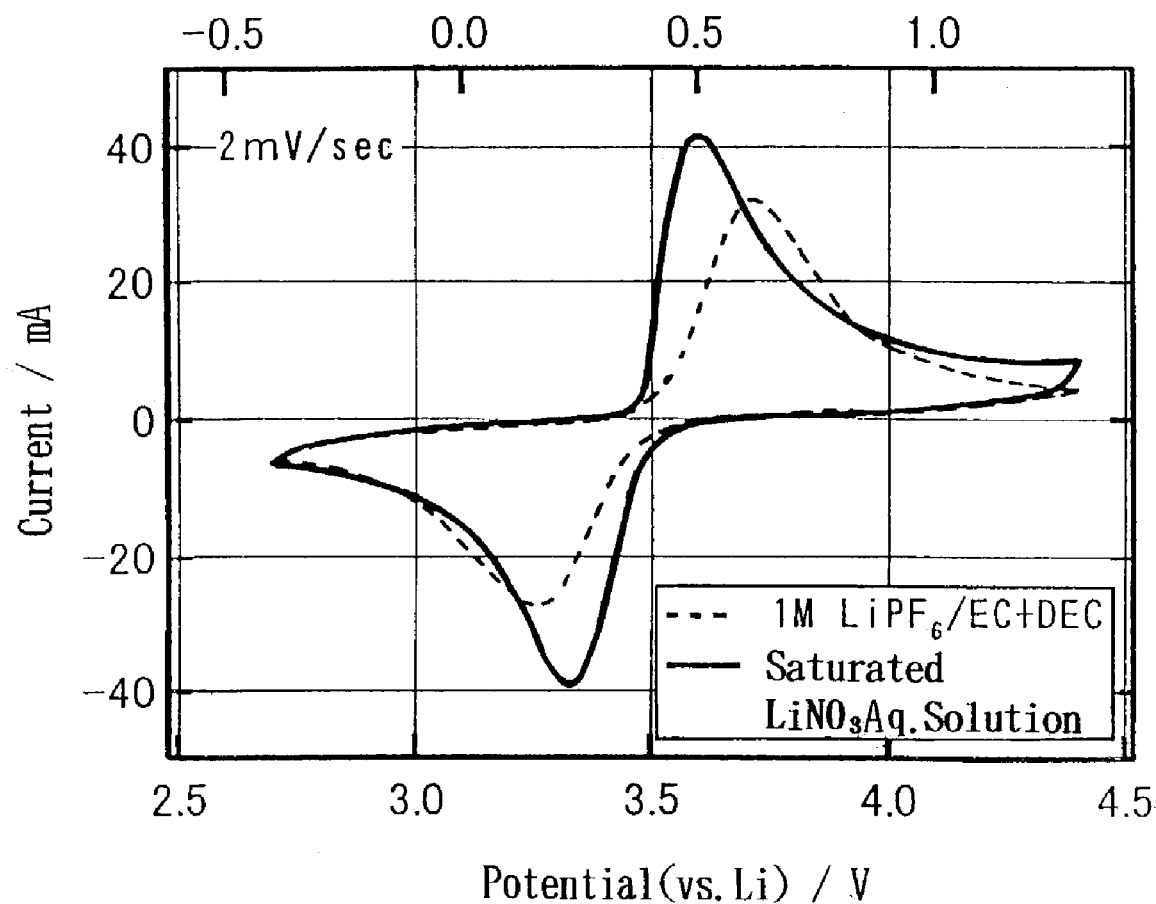
FIG. 4 illustrates a CV curve, which was obtained in a single electrode evaluation test by means of a cyclic voltamogram, on an olivine structure lithium-iron composite phosphorus oxide.

Note that 2 types of the cyclic voltamogram were carried out by changing the electrolytic solution. One of them was carried out by using a nonaqueous electrolytic solution in which $LiPF_6$ was dissolved in a concentration of 1M in a mixture solvent, in which ethylene carbonate and diethyl carbonate were mixed with a ratio of 3:7 by volume, and the other one of them was carried out by using an $LiNO_3$ aqueous solution with a saturated concentration in which $LiNO_3$, being a lithium salt, was dissolved in water. Then, in case of the nonaqueous electrolytic solution, both of the reference electrode and mating electrode were arranged to be metallic Li, in case of the aqueous electrolytic solution, the reference electrode was arranged to be a silver-silver chloride electrode and the mating electrode was arranged to be a platinum wire ($\phi$0.3 mm×5 mm; coil shape), and a tri-polar beaker cell was used respectively, and the scanning speed was arranged to be 2 mV/s. By this test, CV curves were obtained which showed the relationships between the currents and the potentials. The obtained CV curves are illustrated in FIG. 4. In FIG. 4, the solid line illustrates the results by using the aqueous electrolytic solution, and the dashed line illustrates the results by using the nonaqueous electrolytic solution.

From FIG. 4, it was found out that the present lithium-iron composite phosphorus oxide shows a so-called 2-phase coexisting lithium dope-undope behavior which has one and only oxidation-reduction potential. Namely, different from $LiNiO_2$ and $LiCoO_2$ in which the lattice constants and the like vary continuously with the dope-undope of lithium to vary the potential in charge-discharge, the present lithium-iron composite phosphorus oxide shows a constant potential in charge-discharge. Then, the potential of charge-discharge is at around 3.5 V (vs. Li/Li$^+$), and this potential is within a potential range where the oxygen generation by means of the electrolysis of water does not arise.

Therefore, the present lithium-iron composite phosphorus oxide can reversibly dope-undope lithium ions in a large amount within a potential range where the oxygen generation by means of the electrolysis of water does not arise, and it was possible to confirm that it is suitable as the positive electrode active material in aqueous lithium secondary batteries.

Moreover, in the CV curves illustrated in FIG. 4, the difference resulting from the electrolytic solutions appears clearly in how the peaks rise. In case of using the aqueous electrolytic solution, compared to the case where the nonaqueous solution was used, it is understood that the rising of the peak is steeper and the polarization is less. Namely, it shows that, when the aqueous electrolytic solution is used, the reaction resistance in the oxidation-reduction reaction is less.

Exhibiting small reaction resistance means that, in case of constituting batteries by using the present lithium-iron composite phosphorus oxide as the positive electrode active material, the internal resistance of the batteries reduces in charge-discharge so that the power characteristics of the batteries are improved. Therefore, it was confirmed that the present lithium-iron composite phosphorus oxide is more suitable for aqueous lithium secondary batteries.

(d) Synthesis of Layered Rocksalt Structure

Lithium-Nickel Composite Oxide

By the respective methods, the so-called liquid phase method and solid phase method, two types of the lithium-nickel composite oxides were synthesized.

(a-1) Synthesis by Liquid Phase Method

Respective 2M aqueous solutions of nickel nitrate, cobalt nitrate and aluminum nitrate were mixed so that Ni:Co:Al was 8:1.5:0.5 by molar ratio, and were made into an aqueous solution of 500 mL. This aqueous solution was dropped into a 4M sodium hydroxide aqueous solution, and hydroxide particles, containing nickel, cobalt and aluminum, were precipitated and synthesized. Then, the precipitated hydroxide particles were filtered and washed, and were thereafter charged into water, thereby obtaining a hydroxide slurry. So as to arrange, with respect to the sum (Ni+Co+Al) of Ni, Co and Al in the hydroxide slurry, the atomic ratio of Li to be Li/(Ni+Co+Al)=1, a 3M lithium hydroxide aqueous solution was added to the aforementioned slurry, thereby preparing a dispersion liquid, and this dispersion liquid was dried by spraying in a nitrogen gas atmosphere. After drying, the obtained composite oxide precursors were calcined preliminarily at 350° C. in a nitrogen atmosphere for 1 hour, and were further calcined at 750° C. in an oxygen atmosphere for 12 hours, thereby obtaining a lithium-nickel composite oxide.

(d-2) Synthesis by Solid Phase Reaction Method $LiOH.H_2O$, $Ni(OH)_2$, $Co_3O_4$ and $Al(OH)_3$, making raw materials, were mixed respectively so that Li, Ni, Co and Al were 1:0.8:0.15:0.05 by molar ratio. Then, this mixture was calcined at a temperature of 900° C. in an oxygen gas flow for 24 hours, and, after cooling, it was pulverized, thereby obtaining a powdered lithium-nickel composite oxide.

(2) Manufacture of Negative Electrode

As negative electrode active materials, $TiS_2$, $V_2O_5$, $LiMn_2O_4$, a lithium-vanadium composite oxide expressed by a composition formula $Li_{1.5}V_3O_{7.8-\delta}$, a spinel structure lithium-vanadium composite oxide expressed by a composition formula $LiV_2O_4$, and a lithium-vanadium composite oxide expressed by a composition formula $LiV_3O_8$ were used respectively to manufacture negative electrodes.

Similarly to the positive electrodes, 70 parts by weight of the aforementioned active-material raw materials were mixed with 25 parts by weight of carbon as a conductor and 5 parts by weight of polytetrafluoroethylene as a binder, thereby obtaining negative-electrode raw-material mixtures. Subsequently, 10 mg of these negative-electrode raw-material mixtures were bonded by pressing onto a mesh, which had been welded onto inside a coin cell in advance and was made of stainless, with about 0.6 ton/cm², thereby making negative electrodes. In following (a)–(c), the synthesis methods of the respective lithium-vanadium composite oxides and their characteristics and the like as the negative electrode active materials will be described.

(a) Synthesis of Lithium-Vanadium Composite Oxide Expressed by Composition Formula 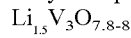$Li_{1.5}V_3O_{7.8-\delta}$ and Survey on Characteristic as Negative Electrode Active Material 1.688 g of lithium carobnate ($Li_2CO_3$) and 8.312 g of vanadium pentoxide ($V_2O_5$) were mixed with an automatic mortar for a period of 2 hours. This mixture was heated to a calcination temperature of 680° C. at a temperature increment rate of 4.33° C./min. in an argon gas flow, was held at the temperature for 12 hours, and was thereafter cooled to room temperature at a temperature decrement rate of 4.33° C./min., thereby obtaining a lithium-vanadium composite oxide. The obtained lithium-vanadium composite oxide was, as a result of composition analysis, one whose composition was $Li_{1.5}V_3O_{7.8-\delta}$. Moreover, this lithium-vanadium composite oxide was, in order to use it as the negative electrode active material, turned into a powdered one by pulverizing with a mortar.

Figure 2:
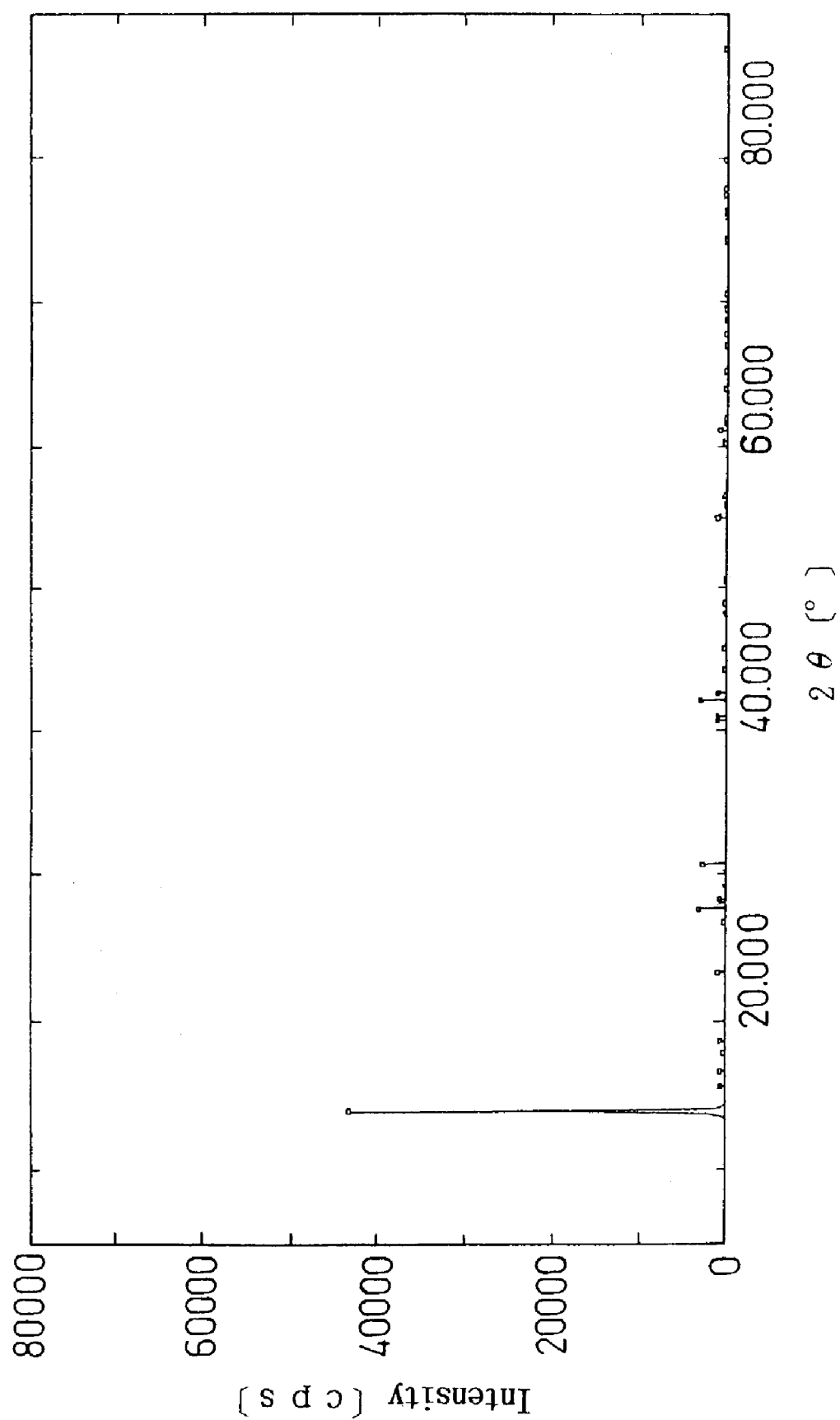
FIG. 2 illustrates an X-ray diffraction chart by means of CuKα ray on a lithium-vanadium composite oxide which was used in a secondary battery of an experimental example and is expressed by a composition formula $Li_{1.5}V_3O_{7.8-8}$.
Figure 3:
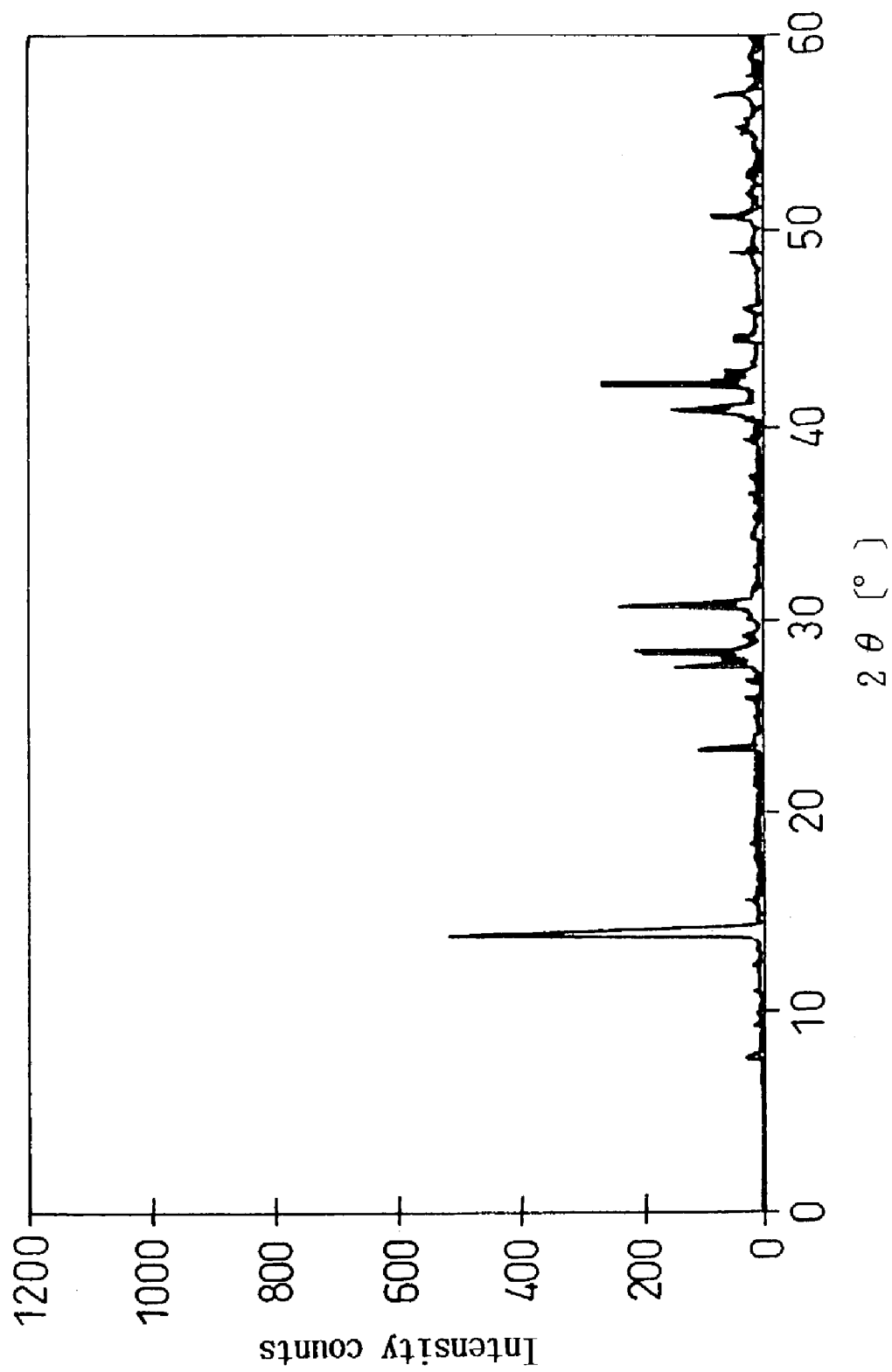
FIG. 3 illustrates an X-ray diffraction chart by means of CuKα ray on a lithium-vanadium composite oxide which has been investigated as a negative electrode active material conventionally and is expressed by a composition formula $LiV_3O_8$.

With respect to this lithium-vanadium composite oxide, an X-ray diffraction analysis by means of CuKα ray was carried out. An X-ray diffraction chart obtained as the result is illustrated in FIG. 2. As described above, in the X-ray diffraction chart illustrated in FIG. 2, it is possible to confirm that the highest peak is at 2θ≈13.9° (θ being diffraction angle) and the intensities of the other peaks, excepting the peak, are extremely low, and, moreover, it is possible to confirm that the intensity of the highest peak is a value which is 5 times or more as much as the intensity values of all of the other peaks.

Moreover, an electrode was manufactured in which the present lithium-vanadium composite oxide was made into the active material, and the characteristic as the negative electrode active material was surveyed by carrying out a single electrode evaluation test. First, 70 parts by weight of the lithium-vanadium composite oxide were mixed with 25 parts by weight of carbon as a conductor and 5 parts by weight of polytetrafluoroethylene as a binder, thereby obtaining an electrode raw-material mixture. Subsequently, 10 mg of this electrode raw-material mixture was bonded by pressing onto a mesh, which was made of stainless, with a pressure of about 0.6 ton/cm², thereby making an electrode.

Next, by using a tri-polar beaker cell in which a silver-silver chloride electrode was made into the reference electrode and a platinum wire (φ0.3 mm×5 mm; coil shape) was made into the mating electrode, a single electrode evaluation test on the aforementioned electrode was carried out. The single electrode evaluation test was arranged so that charge-discharge was carried out in a potential of from 0.265 V to −0.75 V at a constant current whose current density was 2 mA/cm², and, by this test, a charge-discharge curve (curve which shows the relationship between capacities and potentials) in the range was obtained. The obtained charge-discharge curve is illustrated in FIG. 5.

Figure 5:
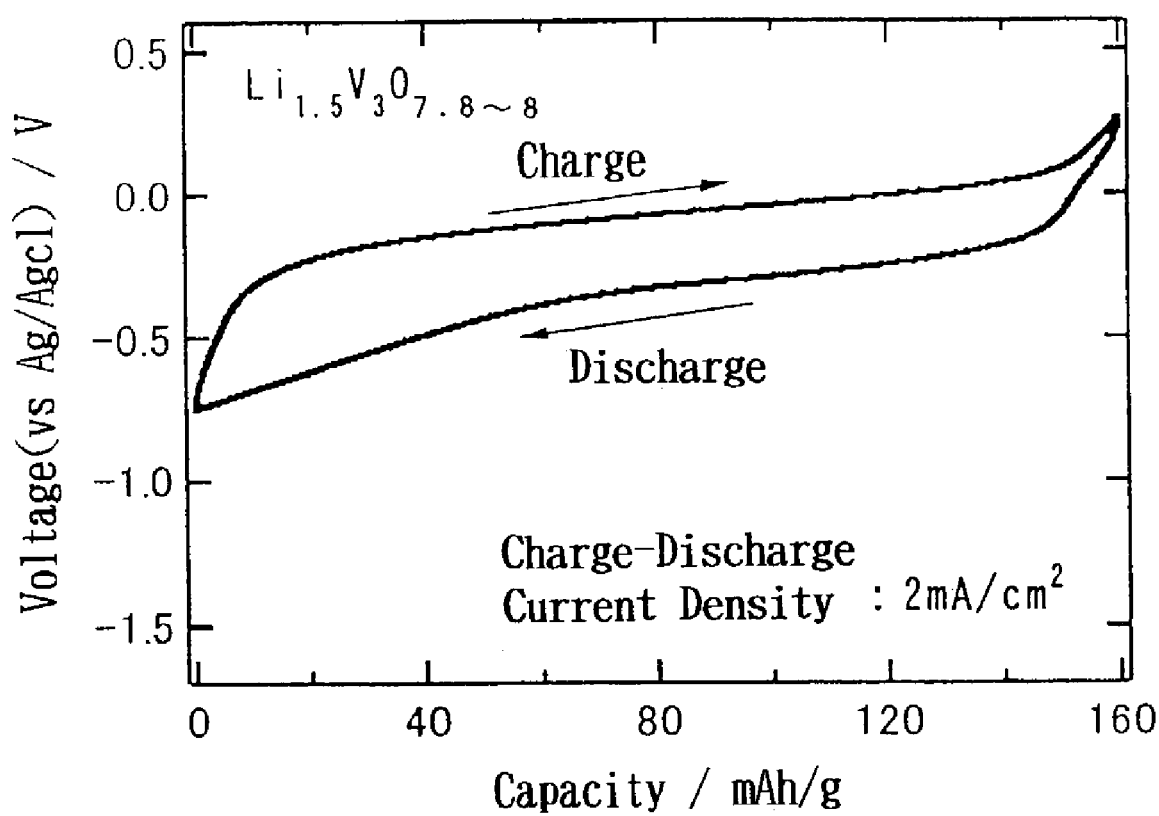
FIG. 5 illustrates a charge-discharge curve, which was obtained by a single electrode evaluation test, on a lithium-vanadium phosphorus oxide which is expressed by a composition formula $Li_{1.5}V_3O_{7.8-8}$.

As it is apparent from FIG. 5, this charge-discharge potential range is a suitable potential range for the negative electrode active material of aqueous lithium secondary batteries, and the charge-discharge curve is flat in the range, and the capacity per unit weight of active material is also as large as 160 mAh/g. Therefore, it is possible to confirm that the present lithium-vanadium composite oxide is an active-material raw material which exhibits good characteristic as the negative electrode active material of aqueous lithium secondary batteries.

Note that, as a result of carrying out a single electrode evaluation test on $TiS_2$, used as the negative electrode active material, under the aforementioned conditions, although the theoretical capacity is said to be 240 mAh/g ($Li_aTiS_2$: of $0 \leq a \leq 1$), the capacity was 142 mAh/g in the actual measurement under these conditions. Moreover, showing the theoretical capacities of $V_2O_5$ and $LiMn_2O_4$, being the other negative electrode active materials which have been investigated conventionally, they are 147 mAh/g ($Li_bV_2O_5$: of $0 \leq b \leq 1$) for $V_2O_5$ and 148 mAh/g ($Li_cMn_2O_4$: of $1 \leq c \leq 2$) for $LiMn_2O_4$, and it is possible to confirm that the present lithium-vanadium composite oxide is one which has a larger capacity than all of these negative-electrode-active-material raw materials. For reference, in Table 1 set forth below, these values are summarized altogether.

TABLE 1

|  | Capacity (mAh/g) | Notes |
| --- | --- | --- |
| $Li_{1.5}V_3O_{7.8-\delta}$ | 160 | Actually Measured Value |
| $TiS_2$ | 142 | Actually Measured Value |
| $V_2O_5$ | 147 | Theoretical Value |
| $LiMn_2O_4$ | 148 | Theoretical Value |

(b) Synthesis of Lithium-Vanadium Composite Oxide Expressed by Composition Formula $LiV_2O_4$ and Survey on Characteristic as Negative Electrode Active Material First, lithium carbonate ($Li_2CO_3$) and vanadium pentoxide ($V_2O_5$) were mixed so that Li:V was 1:2 by molar ratio. The mixing was carried out with an automatic mortar for 20 minutes. Subsequently, with respect to 100 parts by weight of the mixture, Ketjen black was mixed in an amount of 2 parts by weight, thereby making a raw material mixture. The mixing was carried out with an automatic mortar for 20 minutes. The raw material mixture was calcined at 750° C. in an argon gas flow for 24 hours, and was cooled rapidly, thereby obtaining a lithium-vanadium composite oxide. Note that the obtained lithium-vanadium composite oxide was, in order to use it as the negative electrode active material, turned into a powdered one by pulverizing with a mortar.

An electrode was manufactured in which the present lithium-vanadium composite oxide was made into the active material, and the characteristic as the negative electrode material was surveyed by carrying out a single electrode evaluation test. First, 70 parts by weight of the lithium-vanadium composite oxide were mixed with 25 parts by weight of carbon as a conductor and 5 parts by weight of polytetrafluoroethylene as a binder, thereby obtaining an electrode raw-material mixture. Subsequently, 10 mg of this electrode raw-material mixture was bonded by pressing onto a mesh, which was made of stainless, with a pressure of about 0.6 ton/cm$^2$, thereby making an electrode.

Then, by using a tri-polar beaker cell in which a silver-silver chloride electrode was made into the reference electrode and, moreover, a platinum wire ($\phi$0.3 mm×5 mm; coil shape) was made into the mating electrode, a single electrode evaluation test on the aforementioned electrode was carried out in which a scanning speed was arranged to be 2 mV/s. By this test, a CV curve is obtained which shows the relationship between currents and potentials. The obtained CV curve is illustrated in FIG. 6.

Figure 6:
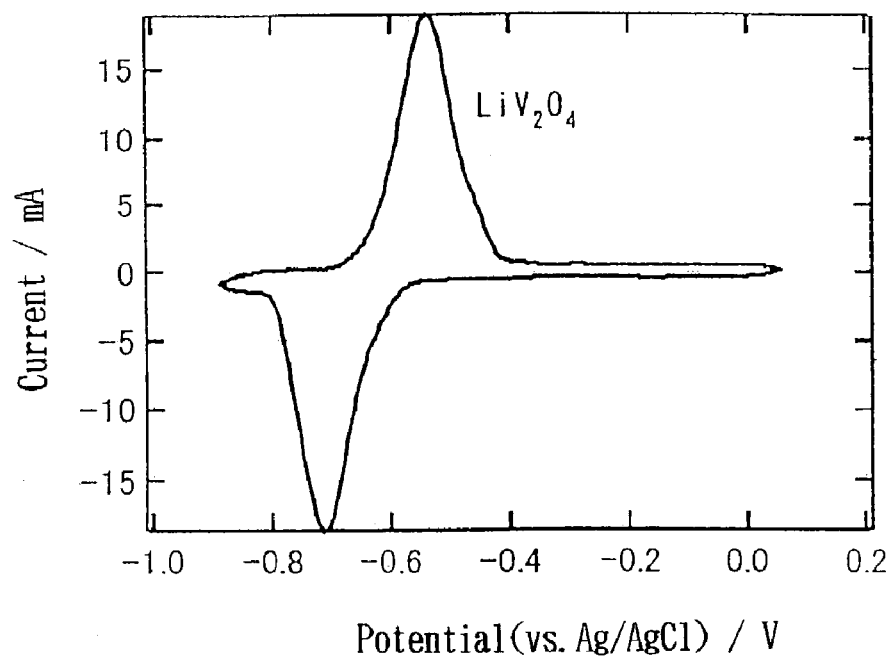
FIG. 6 illustrates a CV curve, which was obtained in a single electrode evaluation test by means of a cyclic voltamogram, on a spinel structure lithium-vanadium composite oxide which is expressed by a composition formula $LiV_2O_4$.

From FIG. 6, it was found out that the present lithium-vanadium composite oxide shows a so-called 2-phase coexisting lithium dope-undope behavior which has one and only oxidation-reduction potential. Namely, different from $LiNiO_2$ and $LiCoO_2$ in which the lattice constants and the like vary continuously with the dope-undope of lithium to vary the potential in charge-discharge, the present lithium-vanadium composite oxide shows a constant potential in charge-discharge. Then, the potential of charge-discharge is at around 2.4 V (vs. Li/Li$^+$), and this potential is within a potential range where the hydrogen generation by means of the electrolysis of water does not arise. Therefore, the present lithium-vanadium composite oxide can reversibly dope-undope lithium ions in a large amount within a potential range where the hydrogen generation by means of the electrolysis of water does not arise, and it was possible to confirm that it is suitable as the negative electrode active material in aqueous lithium secondary batteries.

Figure 7:
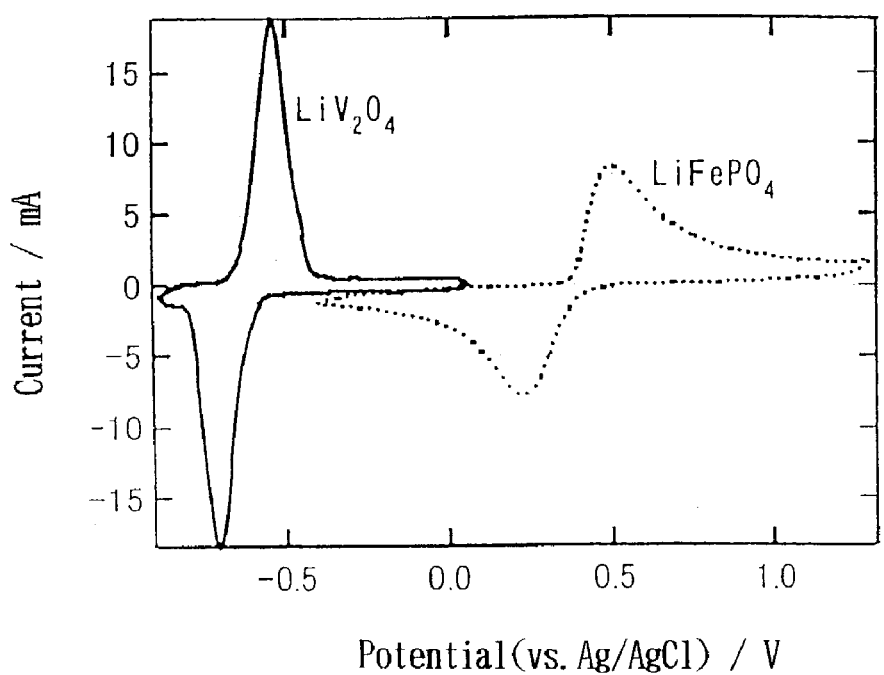
FIG. 7 illustrates CV curves, which were obtained in a single electrode evaluation test by means of a cyclic voltamogram, on a spinel structure lithium-vanadium composite oxide which is expressed by a composition formula $LiV_2O_4$ and on an olivine structure lithium-iron composite phosphorus oxide.

Moreover, a result of a single electrode evaluation test which was carried out on the olivine structure lithium-iron composite phosphorus oxide, used as one of the positive electrode active materials and expressed by a composition formula $LiFePO_4$, is also illustrated in FIG. 7 together with the result of the present lithium-vanadium composite oxide. From FIG. 7, the charge-discharge potential in the lithium-iron composite phosphorus oxide is at around 3.5 V (vs. Li/Li$^+$), and this potential is within a potential range where the oxygen generation by means of the electrolysis of water does not arise. Namely, it was possible to confirm that an aqueous lithium secondary battery of about 1 V-class can be constituted by using the lithium-iron composite phosphorus oxide, expressed by a composition formula $LiFePO_4$, as the positive electrode active material and by using the present lithium-vanadium composite oxide as the negative electrode active material.

(c) Synthesis of Lithium-Vanadium Composite Oxide Expressed by Composition Formula $LiV_3O_8$ Lithium carbonate ($Li_2CO_3$) and vanadium pentoxide ($V_2O_5$) were mixed so that Li:V was 1:3 by molar ratio. The mixing was carried out with an automatic mortar for 20 minutes. Subsequently, the mixture was heated by increasing the temperature to 700° C. in an argon atmosphere, was held at the temperature for 12 hours, and was thereafter cooled in the furnace, thereby obtaining a lithium-vanadium composite oxide. Note that the obtained lithium-vanadium composite oxide was, in the same manner as aforementioned, turned into a powdered one by pulverizing with a mortar.

<Lithium Secondary Battery of First Series>

(1) Manufacture of Lithium Secondary Battery (a) Lithium Secondary Battery of #11

A lithium secondary battery was manufactured in which the hexagonal layered rocksalt structure lithium-manganese composite oxide, obtained by the hydrothermal method, was made into the positive electrode active material, and $TiS_2$ was made into the negative electrode active material. The aqueous lithium secondary battery was manufactured by facing, while intervening a cellulose-based separator, the aforementioned positive electrode and negative electrode, including the respective active materials, and by accommodating them, after impregnating them with an electrolytic solution by injecting it in a predetermined amount, in the type 2032 coin-shaped battery case (outside diameter 20 mm $\phi$, thickness 32 mm). The electrolytic aqueous solution was arranged to be a 5M $LiNO_3$ aqueous solution which was made by dissolving $LiNO_3$, being a lithium salt, in water, and the pH was arranged to be about 7. The thus manufactured aqueous lithium secondary battery was labeled as the lithium secondary battery of #11.

(b) Lithium Secondary Battery of #12

In the lithium secondary battery of #11, an aqueous solution, whose pH was prepared to be 12 by adding LiOH to the 5M $LiNO_3$ aqueous solution, being an electrolytic solution, in a predetermined amount, was used as the electrolytic solution. Excepting that, everything was arranged to be the same as #11 to manufacture an aqueous secondary battery, and it was labeled as a lithium secondary battery of #12.

(c) Lithium Secondary Battery of #13

In the lithium secondary battery of #11, except that the monoclinic zigzag layered structure lithium-manganese composite oxide was made into the positive electrode active material, everything was arranged to be the same as #11 to manufacture an aqueous secondary battery. The manufactured aqueous secondary battery was labeled as a lithium secondary battery of #13.

(d) Lithium Secondary Battery of #14

In the lithium secondary battery of #11, except that the electrolytic solution was changed to a nonaqueous electrolytic aqueous solution; namely, one, in which $LiPF_6$ was dissolved in a mixture solvent, in which ethylene carbonate and diethyl carbonate were mixed by 3:7 by volume ratio, in a concentration of 1M, was used as the electrolytic solution, everything was arranged to be the same as #11 to manufacture an aqueous secondary battery, and it was labeled as a lithium secondary battery of #14.

(e) Lithium Secondary Battery of #15

In the lithium secondary battery of #11, except that the layered rocksalt structure lithium-nickel composite oxide, synthesized by the solid phase method, was made into the charge upper limit voltage of 1.5 V at a constant current, whose current density was 1.0 mA/cm$^2$, and subsequently discharging was carried out down to the discharge lower limit voltage of 0.05 V at a constant current, whose current density was 0.5 mA/cm$^2$. Moreover, the second charge-discharge condition was arranged so that, except that the charge upper limit voltage was arranged to be 1.8 V, charge-discharge was carried out in the same manner as the first condition. The initial capacities of the respective lithium secondary batteries are set forth in Table 2.

TABLE 2

| | Positive Electrode Active Material | Negative Electrode Active Material | Electrolytic Solution (pH Value) | Initial Capacity (mAh/g) | |
|---|---|---|---|---|---|
| | | | | Charge Termination Voltage 1.5 V | Charge Termination Voltage 1.8 V |
| #11 | Layered Rocksalt Structure LiMnO$_2$ | TiS$_2$ | LiNO$_3$ (pH 7) | 41.7 | 79.5 |
| #12 | Layered Rocksalt Structure LiMnO$_2$ | TiS$_2$ | LiNO$_3$ + LiOH (pH 12) | 30.1 | 34.6 |
| #13 | Zigzag Structure LiMnO$_2$ | TiS$_2$ | LiNO$_3$ (pH 7) | 32.2 | 44.0 |
| #14 | Layered Rocksalt Structure LiMnO$_2$ | TiS$_2$ | LiPF$_6$/EC + DEC | 11.0 | 21.7 |
| #15 | Layered Rocksalt Structure LiNi$_{0.8}$Co$_{0.15}$Al$_{0.05}$O$_2$ | TiS$_2$ | LiNO$_3$ (pH 7) | Could Not Be Charged | Could Not Be Charged |
| #16 | Layered Rocksalt Structure LiNi$_{0.8}$Co$_{0.15}$Al$_{0.05}$O$_2$ | TiS$_2$ | LiNO$_3$ + LiOH (pH 12) | Could Not Be Charged | Could Not Be Charged |
| #17 | Layered Rocksalt Structure LiMnO$_2$ | V$_2$O$_5$ | LiNO$_3$ (pH 7) | Could Not Be Charged | Could Not Be Charged | positive electrode active material, everything was arranged to be the same as #11 to manufacture an aqueous secondary battery. The manufactured aqueous secondary battery was labeled as a lithium secondary battery of #15.

(f) Lithium Secondary Battery of #16

In the lithium secondary battery of #11, except that the positive electrode active material was changed to the layered rocksalt structure lithium-nickel composite oxide, used in the aforementioned lithium secondary battery of #15, and further an aqueous solution, whose pH was prepared to be 12 by adding LiOH to the 5M LiNO$_3$ aqueous solution, being an electrolytic solution, in a predetermined amount, was used as the electrolytic solution, everything was arranged to be the same as #11 to manufacture an aqueous secondary battery, and it was labeled as a lithium secondary battery of #16.

(g) Lithium Secondary Battery of #17

In the lithium secondary battery of #11, except that the negative electrode active material was changed; namely, V$_2$O$_5$ was used, everything was arranged to be the same as #11 to manufacture an aqueous secondary battery, and it was labeled as a lithium secondary battery of #17.

(2) Assessment on Initial Capacity

The aforementioned respective lithium secondary batteries of #11 through #17 were charged and discharged under the following two types of conditions to measure the initial capacities. The first charge-discharge condition was arranged so that, at 20° C., charging was carried out up to the In Table 2, those identified with "Could Not Be Charged" are the ones which did not reach the charge termination voltages after 9 hours passed from the start of charging. As it is apparent from Table 1, it was possible for all of the secondary batteries of #11 through #13 to obtain large capacities. In particular, it is understood that the secondary battery of #11, using the hexagonal layered rocksalt structure lithium-manganese composite oxide as the positive electrode active material, is of large capacity. This is because the layered rocksalt structure lithium-manganese composite oxide, being the positive electrode active material, could, in a potential range where the oxygen generation by means of the electrolysis of water did not arise, dope-undope lithium ions. Meanwhile, the lithium secondary batteries of #15 through #17 could not be charged. This is believed that the oxygen or hydrogen generation by means of the electrolysis of water arose so that it was not possible to dope-undope lithium ions.

Figure 8:
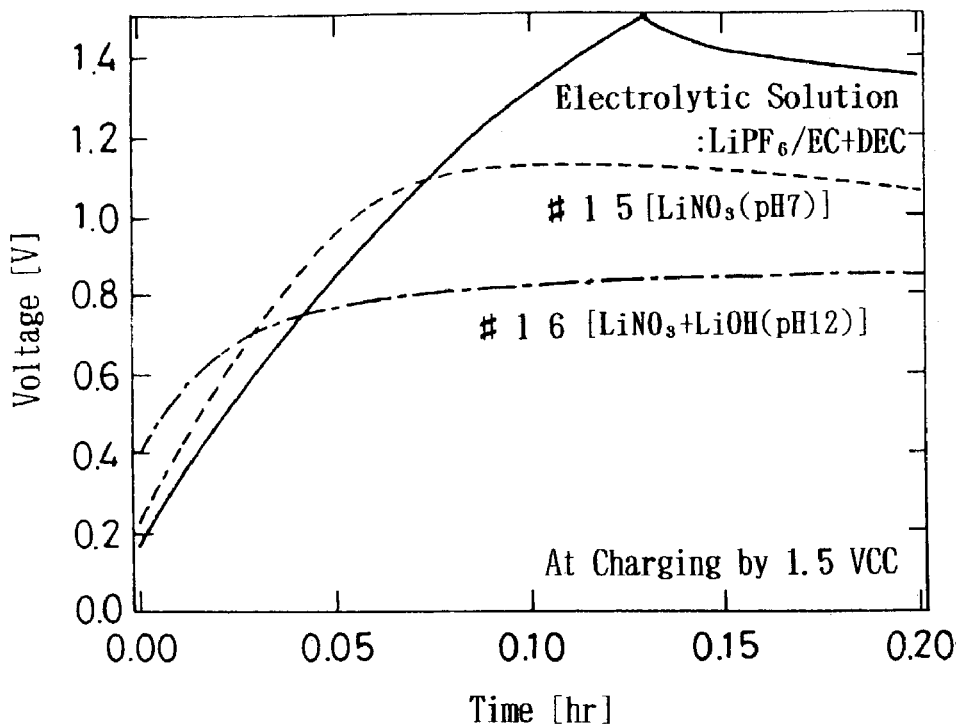
FIG. 8 illustrates charge curves on lithium secondary batteries of #15 and #16.

Note that, in FIG. 8, there are illustrated the variations of the potentials of the lithium secondary batteries of #15 and #16 during charging. Note that, in FIG. 8, there is illustrated the variation of the potential of a nonaqueous secondary battery, using the same positive electrode and negative electrode as those of #15 and #16, and using a nonaqueous solution in which LiPF$_6$ was dissolved in a mixture solvent, in which ethylene carbonate and diethyl carbonate were mixed by volume ratio of 3:7, in a concentration of 1M, with a solid line for reference.

From FIG. 8, the lithium secondary battery, using the nonaqueous electrolytic solution, is such that the potential increases immediately after starting charging, but the secondary batteries of #15 and #16 are such that the potential, after reaching a predetermined potential, does not increase more than that. In addition, the secondary battery of #16, using the electrolytic solution whose pH is 12, is of lower potential than the secondary battery of #15, using the electrolytic solution whose pH is 7. Namely, the higher the pH value is the lower the oxygen generation potential is, and accordingly, in charging the secondary batteries of #15 and #16, it is believed that it is highly probable that oxygen generates at the positive electrode.

Moreover, the secondary battery of #11 is of considerably larger capacity than the secondary battery of #14. This is believed that, since aqueous solutions are better than non-aqueous solutions in terms of conductivity, the secondary battery of #11, using the aqueous solution as the electrolytic solution, was of lower internal resistance than the secondary battery of #14, using the nonaqueous solution as the electrolytic solution. Note that, in order to assess the internal resistances of the respective secondary batteries of #11 through #17, the impedance of each of the respective secondary batteries was measured. The measurement method was such that the alternate-current resistance at 1 kHz was measured by the 4-terminal method. The results of the measurement are set forth in Table 3.

TABLE 3

|  | Positive Electrode Active Material | Negative Electrode Active Material | Electrolytic Solution (pH Value) | Impedance ($\Omega$) |
|---|---|---|---|---|
| #11 | Layered Rocksalt Structure $LiMnO_2$ | $TiS_2$ | $LiNO_3$ (pH 7) | 1.56 |
| #12 | Layered Rocksalt Structure $LiMnO_2$ | $TiS_2$ | $LiNO_3$ + LiOH (pH 12) | 1.46 |
| #13 | Zigzag Structure $LiMnO_2$ | $TiS_2$ | $LiNO_3$ (pH 7) | 1.93 |
| #14 | Layered Rocksalt Structure $LiMnO_2$ | $TiS_2$ | $LiPF_6$/EC + DEC | 6.60 |
| #15 | Layered Rocksalt Structure $LiNi_{0.8}Co_{0.15}Al_{0.05}O_2$ | $TiS_2$ | $LiNO_3$ (pH 7) | 1.21 |
| #16 | Layered Rocksalt Structure $LiNi_{0.8}Co_{0.15}Al_{0.05}O_2$ | $TiS_2$ | $LiNO_3$ + LiOH (pH 12) | 1.08 |
| #17 | Layered Rocksalt Structure $LiMnO_2$ | $V_2O_5$ | $LiNO_3$ (pH 7) | 1.12 |

As it is apparent from Table 3, the nonaqueous electrolytic solution, used in the secondary battery of #14, is of larger resistance than the aqueous electrolytic solutions, used in the other secondary batteries, and, compared to the secondary battery of #11, is about a quadruple resistance value. Therefore, the lithium secondary batteries according to the present invention, using the aqueous solutions as the electrolytic solution, are of large capacity, and, in addition, they are of small internal resistance and are good in terms of power characteristic and rate characteristic as well.

(3) Assessment on Cycle Characteristic

Next, on the lithium secondary battery of #11, a charge-discharge cycle test was carried out in order to assess the cycle characteristic. The charge-discharge cycle test was carried out at two types of temperatures, 20° C., being room temperature, and 60° C., considered to be the upper limit of actual service temperature range. The conditions were arranged so that charge-discharge, in which charging was carried out up to the charge termination voltage of 1.5 V at a constant current, whose current density was 1.0 mA/cm$^2$, and subsequently discharging was carried out down to the discharge termination voltage of 0.05 V at a constant current, whose current density was 0.5 mA/cm$^2$, was regarded as one cycle and this cycle was repeated by 100 cycles. Note that the intermission time between the charge and discharge was arranged to be 1 minute. Moreover, in the same manner, a charge-discharge cycle test was carried out in which the charge termination voltage was arranged to be 1.8 V.

Figure 9:
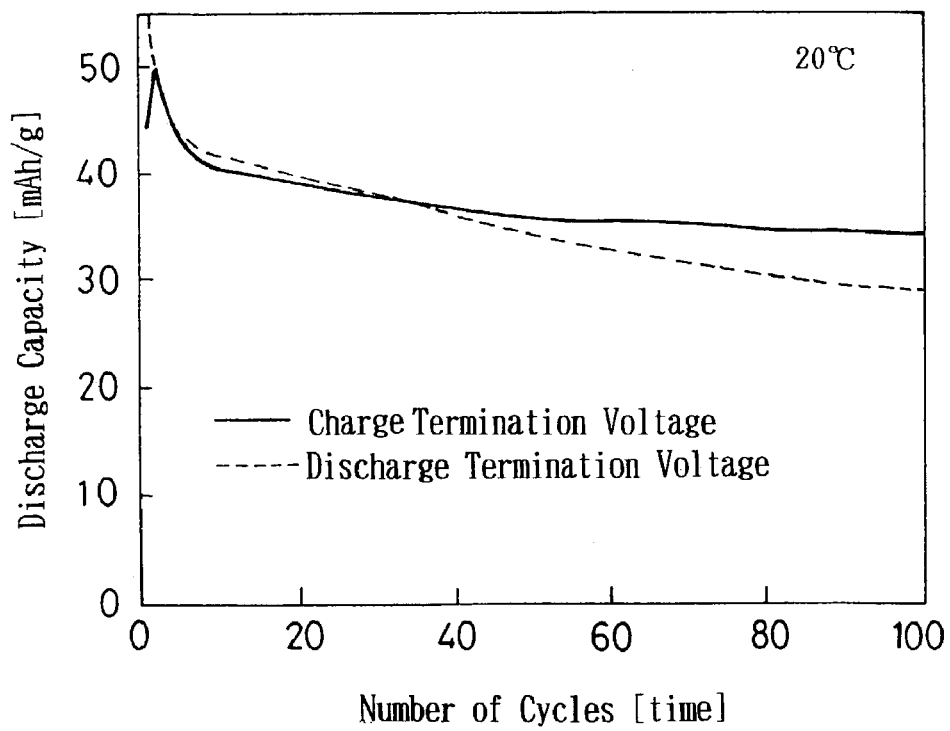
FIG. 9 illustrates discharge capacities on a lithium secondary battery of #11 in respective cycles at 20° C.
Figure 10:
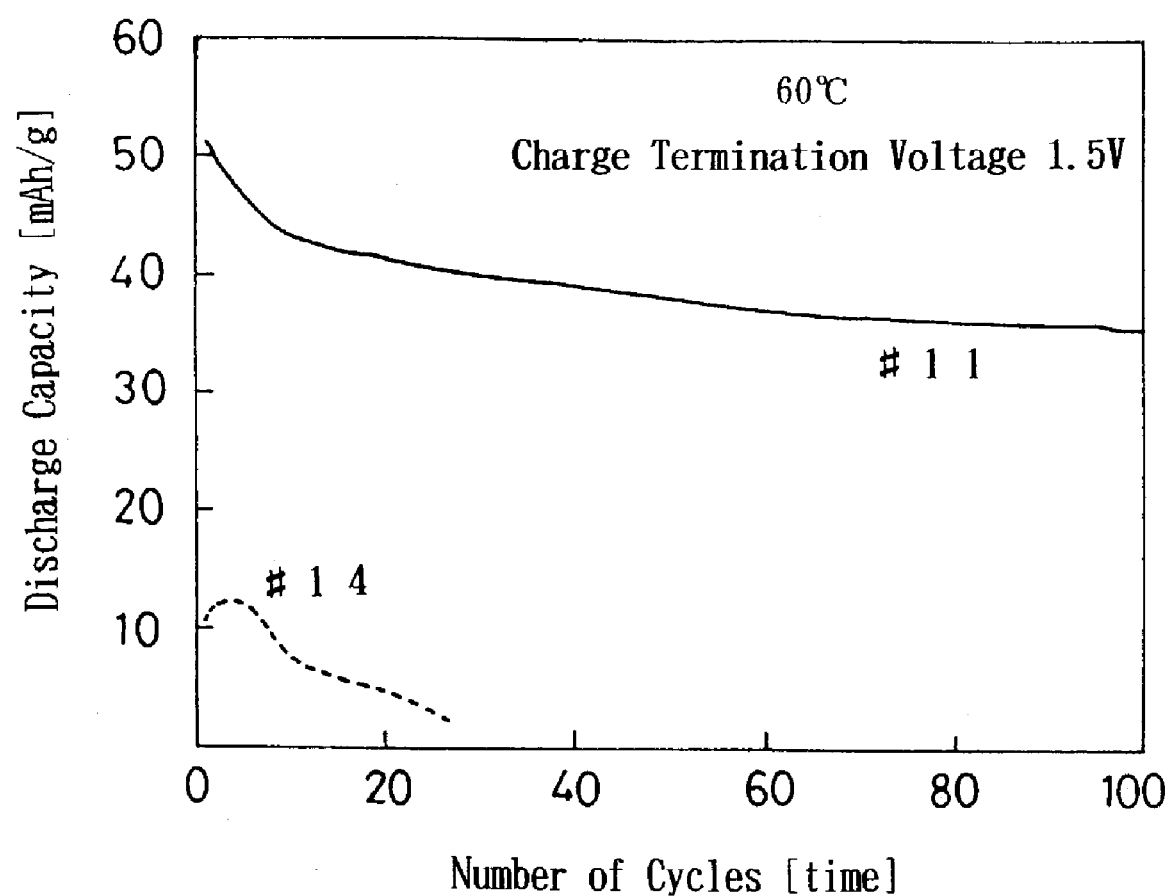
FIG. 10 illustrates discharge capacities on lithium secondary batteries of #11 and #14 in respective cycles at 60° C.

The discharge capacities at the respective cycles were measured, and the results are illustrated in graphs of FIG. 9 and FIG. 10. FIG. 9 is a graph for illustrating the discharge capacities at 20° C. at the respective cycles, and, moreover, FIG. 10 is a graph for illustrating, in case of arranging the charge termination voltage to be 1.5 V, the discharge capacities at 60° C. at the respective cycles. Note that, in FIG. 10, there is simultaneously illustrated the discharge capacities of the lithium secondary battery of #14, being a nonaqueous secondary battery, discharge capacities which were measured by carrying out the charge-discharge cycle test at 60° C. similarly.

As it is apparent from FIG. 9, it is understood that, regardless of the charge termination voltages, the capacities decrease somewhat by the initial 10 times of charge-discharge, but the subsequent capacity decrements are small so that the cycle characteristics are good. Moreover, from FIG. 10, it is understood that the lithium secondary battery of #11 is such that, even at a temperature as high as 60° C., the capacity decrement by repeating charge-discharge is small, and that its cycle characteristic is very good. Meanwhile, the lithium secondary battery of #14 is such that the capacity decrement is considerable. This is believed that, since the lithium secondary battery of #14 uses the organic solvent, being a nonaqueous solution, as the electrolytic solution, its internal resistance is large and further it is susceptible to the resistance increment accompanied by charge-discharge.

Therefore, it was possible to confirm that the lithium secondary battery according to the present invention, in which the capacity decrement is less even after repeating charge-discharge, is of good cycle characteristic. Moreover, in particular, it was possible to confirm that it is a secondary battery whose cycle characteristic is good at high temperatures.

<Lithium Secondary Battery of Second Series>

(1) Manufacture of Lithium Secondary Battery (a) Lithium Secondary Battery of #21

A lithium secondary battery was manufactured in which the hexagonal layered rocksalt structure lithium-manganese composite oxide, obtained by the solid phase method, was made into the positive electrode active material, and the lithium-vanadium composite oxide, expressed by a composition formula $Li_{1.5}V_3O_{7.8-\delta}$, was made into the negative electrode active material. The aqueous lithium secondary battery was manufactured by facing, while intervening a cellulose-based separator, the aforementioned positive electrode and negative electrode, including the respective active materials, and by accommodating them, after impregnating them with an electrolytic solution by injecting it in a predetermined amount, in the type 2016 coin-shaped battery case (outside diameter 20 mm $\phi$, thickness 16 mm). The electrolytic solution was an $LiNO_3$ aqueous solution having a saturated concentration, which was made by dissolving $LiNO_3$, being a lithium salt, in water, and the pH value was arranged to be about 7. The thus manufactured aqueous lithium secondary battery was labeled as the lithium secondary battery of #21.

(b) Lithium Secondary Batteries of #22 through #24

Lithium secondary batteries were manufactured in which only the negative electrode active materials were different from the aforementioned lithium secondary battery of #21 and the other constituent elements were identical therewith. The used negative electrode active materials were those listed in the paragraph of the aforementioned single electrode evaluation test on the lithium-vanadium composite oxides, expressed by a composition formula $Li_{1.5}V_3O_{7.8-\delta}$, the lithium secondary battery, using $TiS_2$, was labeled as the lithium secondary battery of #22, the lithium secondary battery, using $V_2O_5$, was labeled as the lithium secondary battery of #23, and the lithium secondary battery, using $LiMn_2O_4$, was labeled as the lithium secondary battery of #24.

(2) Charge-Discharge Cycle Test

With respect to the aforementioned respective lithium secondary batteries of #21 through #24, a charge-discharge cycle test was carried out. The charge-discharge cycle test was arranged so that, at an environmental temperature of 20° C., charge-discharge, in which charging was carried out up the cell voltage of 1.2 V at a constant current, whose current density was 0.5 mA/cm$^2$, and thereafter discharging was carried out down to the cell voltage of 0.1 V at a constant current, whose current density was 0.5 mA/cm$^2$, was regarded as one cycle and this cycle was repeated by 100 cycles. Note that the charging intermission time and the discharging intermission time in the charge-discharge cycle were arranged to be 1 minute, respectively. As the results of this charge-discharge cycle test, the measured first time discharge capacities per unit weight of the positive electrode active material of the respective lithium secondary batteries are set forth in Table 4 below.

TABLE 4

| | Negative Electrode Active Material | First Time Discharge Capacity (mAh/g) |
|---|---|---|
| #21 | $Li_{1.5}V_3O_{7.8-\delta}$ | 45.2 |
| #22 | $TiS_2$ | 42.1 |
| #23 | $V_2O_5$ | 25.5 |
| #24 | $LiMn_2O_4$ | 33.1 |

As it is apparent from aforementioned Table 4, it is understood that, compared to the lithium secondary battery of #23, using $V_2O_5$ as the negative electrode active material, and to the lithium secondary battery of #24, using $LiMn_2O_4$ as the negative electrode active material, the lithium secondary battery of #21, using $Li_{1.5}V_3O_{7.8-\delta}$, and the lithium secondary battery of #22, using $TiS_2$, are such that their discharge capacities are large from the initial period of charge-discharge. Therefore, it is possible to confirm that the lithium secondary battery, using the lithium-vanadium composite oxide having the aforementioned specific crystalline structure for the negative electrode active material, is an aqueous lithium secondary battery of large capacity.

The cycle characteristics of the lithium secondary batteries of #21 and #22 whose initial discharge capacities were large will be compared. As another result of the aforementioned charge-discharge cycle test, in FIG. 11, there are illustrated the discharge capacities per unit weight of the positive electrode active material at the respective cycles in the charge-discharge cycle test on the two secondary batteries.

Figure 11:
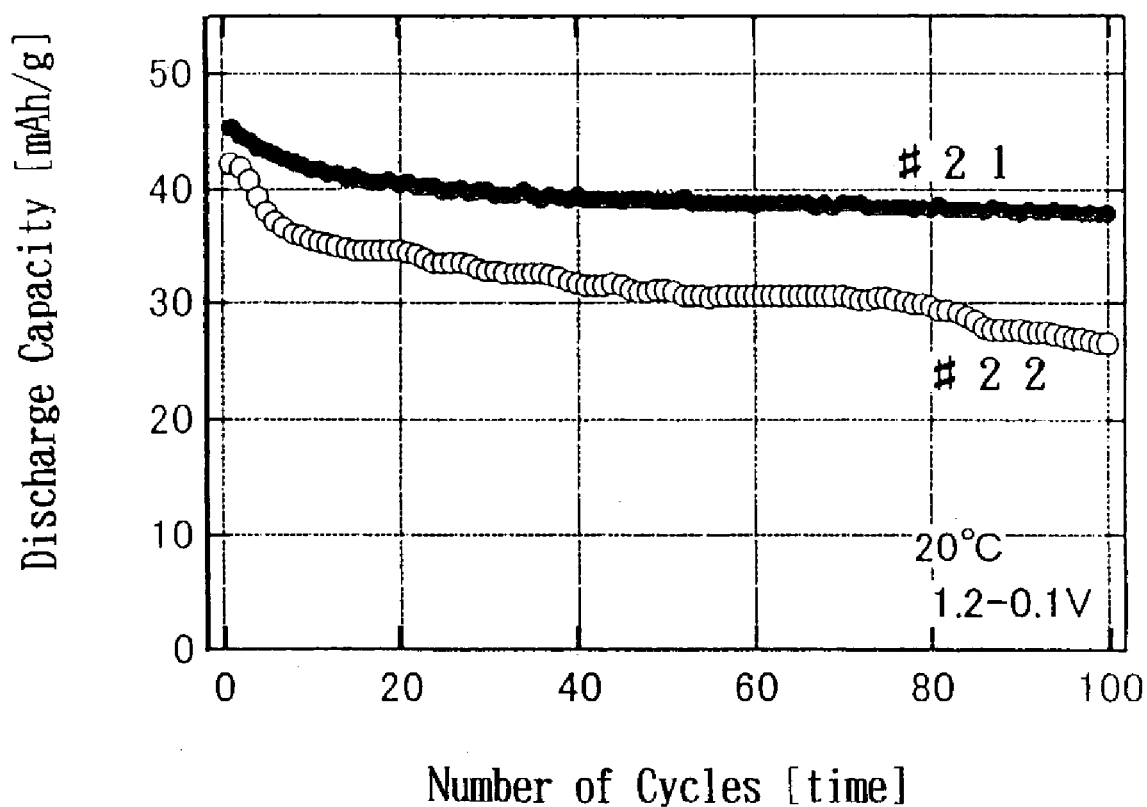
FIG. 11 illustrates discharge capacities per unit weight of positive electrode active materials on secondary batteries of #21 and #22 in respective cycles at 20° C.

As it is apparent from FIG. 11, it is understood that, compared to the lithium secondary battery of #22 using $TiS_2$, the lithium secondary battery of #21 using $Li_{1.5}V_3O_{7.8-\delta}$ maintains much larger capacities even in case of repeating the cycle. It is believed that the capacity decrement of the lithium secondary battery of #22 results from the fact that S in the active material is slightly unstable in aqueous electrolytic solutions, and from the decomposition and the like of the electrolytic solution by the potential decrement of the negative electrode. From this result, it was possible to confirm that the lithium secondary battery according to the present invention, which used the lithium-vanadium composite oxide having the aforementioned specific crystalline structure for the negative electrode active material, is a secondary battery which is good in terms of cycle characteristic as well.

<Lithium Secondary Battery of Third Series>

(1) Manufacture of Lithium Secondary Battery (a) Lithium Secondary Battery of #31

A lithium secondary battery was manufactured in which the olivine structure lithium-iron composite phosphorus oxide was made into the positive electrode active material, and the lithium-vanadium composite oxide, expressed by a composition formula $Li_{1.5}V_3O_{7.8-\delta}$, was made into the negative electrode active material. The aqueous lithium secondary battery was manufactured by facing, while intervening a cellulose-based separator, the aforementioned positive electrode and negative electrode, including the respective active materials, and by accommodating them, after impregnating them with an electrolytic solution by injecting it in a predetermined amount, in the type 2016 coin-shaped battery case. The electrolytic solution was an $LiNO_3$ aqueous solution having a saturated concentration, which was made by dissolving $LiNO_3$, being a lithium salt, in water, and the pH value was arranged to be about 7. The thus manufactured aqueous lithium secondary battery was labeled as the lithium secondary battery of #31.

(b) Lithium Secondary Batteries of #32 and #32

Two types of lithium secondary batteries were manufactured in which only the positive electrode active materials were different from the aforementioned lithium secondary battery of #31 and the other constituent elements were identical therewith. In one of them, the hexagonal layered rocksalt structure lithium-manganese composite oxide, obtained by the hydrothermal method, was made into the positive electrode active material, and the manufactured lithium secondary battery was labeled as the lithium secondary battery of #32. In the other one of them, the layered rocksalt structure lithium-nickel composite oxide, obtained by the liquid phase method, was made into the positive electrode active material, and the manufactured lithium secondary battery was labeled as the lithium secondary battery of #33.

(2) Charge-Discharge Cycle Test

With respect to the aforementioned respective lithium secondary batteries of #31 through #33, a charge-discharge cycle test was carried out. The charge-discharge cycle test was arranged so that, at an environmental temperature of 60° C., charge-discharge, in which charging was carried out up the cell voltage of 1.2 V at a constant current, whose current density was 0.5 mA/cm$^2$, and thereafter discharging was carried out down to the cell voltage of 0.1 V at a constant current, whose current density was 0.5 mA/cm$^2$, was regarded as one cycle and this cycle was repeated by 35 cycles. Note that the charging intermission time and the discharging intermission time in the charge-discharge cycle were arranged to be 1 minute, respectively. As the results of this charge-discharge cycle test, the measured first time discharge capacities per unit weight of the positive electrode active materials of the respective lithium secondary batteries are set forth in Table 5 below.

TABLE 5

| | Positive Electrode Active Material | First Time Discharge Capacity (mAh/g) |
|---|---|---|
| #31 | LiFePO$_4$ | 69.1 |
| #32 | LiMnO$_2$ | 57.7 |
| #33 | LiNi$_{0.8}$Co$_{0.15}$Al$_{0.05}$O$_2$ | 18.5 |

As it is apparent from aforementioned Table 5, it is understood that, compared to the lithium secondary battery of #33, using LiNi$_{0.8}$Co$_{0.15}$Al$_{0.05}$O$_2$ as the positive electrode active material, the lithium secondary battery of #31, using LiFePO$_4$ as the positive electrode active material, and the lithium secondary battery of #32, using LiMnO$_2$ as the positive electrode active material, are such that their discharge capacities are large from the initial period of charge-discharge. This is because the lithium-iron composite phosphorus oxide and lithium-manganese composite oxide, being the positive electrode active materials, could dope-undope lithium ions in a large amount in a potential range where the oxygen generation by means of the electrolysis of water did not arise. Therefore, it was possible to confirm that the lithium secondary batteries, using the lithium-iron composite phosphorus oxide and lithium-manganese oxide for the positive electrode active materials, are aqueous lithium secondary batteries of large capacities.

Figure 12:
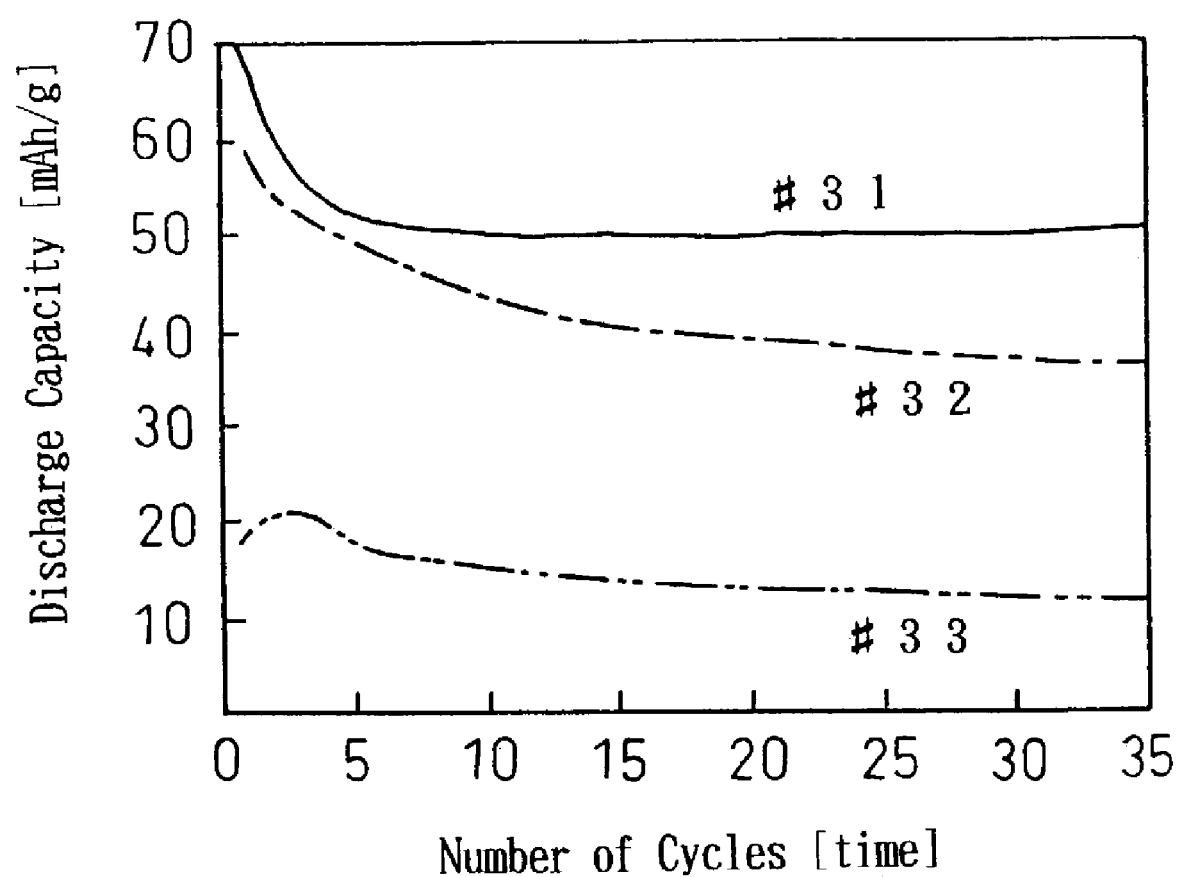
FIG. 12 illustrates discharge capacities per unit weight of positive electrode active materials on secondary batteries of #31 through #33 in respective cycles at 60° C.

Moreover, as another result of the aforementioned charge-discharge cycle test, in FIG. 12, there are illustrated the discharge capacities per unit weight of the positive electrode active materials at the respective cycles in the charge-discharge cycle test on the respective secondary batteries. As it is apparent from FIG. 12, it is understood that, in particular, the lithium secondary battery of #31, using LiFePO$_4$ as the positive electrode active material, maintains larger capacities even in case of repeating the cycle. This is because the lithium-iron composite phosphorus oxide, being a positive electrode active material, is stable in aqueous solutions and it can reversibly dope-undope lithium ions. From this result, it was also possible to confirm that the lithium secondary battery according to the present invention, using the lithium-iron composite oxide, is a secondary battery which is good in terms of cycle characteristic, in particular, cycle characteristic at high temperatures.

<Lithium Secondary Battery of Fourth Series>

(1) Manufacture of Lithium Secondary Battery (a) Lithium Secondary Battery of #41

A lithium secondary battery was manufactured in which the olivine structure lithium-iron composite phosphorus oxide was made into the positive electrode active material, and the lithium-vanadium composite oxide, expressed by a composition formula LiV$_2$O$_4$, was made into the negative electrode active material. The aqueous lithium secondary battery was manufactured by facing, while intervening a cellulose-based separator, the aforementioned positive electrode and negative electrode, including the respective active materials, and by accommodating them, after impregnating them with an electrolytic solution by injecting it in a predetermined amount, in the type 2016 coin-shaped battery case. The electrolytic solution was an LiNO$_3$ aqueous solution having a saturated concentration, which was made by dissolving LiNO$_3$, being a lithium salt, in water, and the pH value was arranged to be about 7. The thus manufactured aqueous lithium secondary battery was labeled as the lithium secondary battery of #41.

(b) Lithium Secondary Battery of #42

In the manufacture of the aforementioned lithium secondary battery of #41, except that the positive electrode active material was changed; namely, the hexagonal layered rocksalt structure lithium-manganese composite oxide, obtained by the hydrothermal method, was made into the positive electrode active material, it was manufactured in the same manner as the aforementioned lithium secondary battery of #41. The manufactured lithium secondary battery was labeled as a lithium secondary battery of #42.

(c) Lithium Secondary Battery of #43

In the manufacture of the aforementioned lithium secondary battery of #41, except that the positive electrode active material was changed; namely, the layered rocksalt structure lithium-nickel composite oxide, obtained by the liquid phase method, was made into the positive electrode active material, it was manufactured in the same manner as the aforementioned lithium secondary battery of #41. The manufactured lithium secondary battery was labeled as a lithium secondary battery of #43.

(d) Lithium Secondary Battery of #44

In the manufacture of the aforementioned lithium secondary battery of #41, except that the negative electrode active material was changed; namely, the lithium-vanadium composite oxide, expressed by a compositional formula LiV$_3$O$_8$, was made into the negative electrode active material, it was manufactured in the same manner as the aforementioned lithium secondary battery of #41. The manufactured lithium secondary battery was labeled as a lithium secondary battery of #44.

(e) Lithium Secondary Battery of #45

In the manufacture of the aforementioned lithium secondary battery of #42, except that the negative electrode active material was changed; namely, the lithium-vanadium composite oxide, expressed by a compositional formula LiV$_3$O$_8$, was made into the negative electrode active material, it was manufactured in the same manner as the aforementioned lithium secondary battery of #42. The manufactured lithium secondary battery was labeled as a lithium secondary battery of #45.

(2) Charge-Discharge Cycle Test

With respect to the aforementioned respective lithium secondary batteries of #41 through #45, a charge-discharge cycle test was carried out. The charge-discharge cycle test was arranged so that, at an environmental temperature of 60° C., charge-discharge, in which charging was carried out up the cell voltage of 1.4 V at a constant current, whose current density was 0.5 mA/cm$^2$, and thereafter discharging was carried out down to the cell voltage of 0.1 V at a constant current, whose current density was 0.5 mA/cm$^2$, was regarded as one cycle and this cycle was repeated by 50 cycles. Note that the charging intermission time and the discharging intermission time in the charge-discharge cycle were arranged to be 1 minute, respectively.

As the results of the charge-discharge cycle test, the measured first time discharge capacities per unit weight of the positive electrode active materials of the respective lithium secondary batteries are set forth in Table 6 below. Note that, as a reference example, a secondary battery was constituted by using LiMn$_2$O$_4$ as the negative electrode active material and the result of measuring its first time discharge capacity is set forth therein simultaneously.

TABLE 6

|  | Positive Electrode Active Material | Negative Electrode Active Material | 1st Time Discharge Capacity (mAh/g) |
| --- | --- | --- | --- |
| #41 | LiFePO$_4$ | LiV$_2$O$_4$ | 73.5 |
| #42 | LiMnO$_2$ | LiV$_2$O$_4$ | 66.0 |
| #43 | LiNi$_{0.8}$Co$_{0.15}$Al$_{0.05}$O$_2$ | LiV$_2$O$_4$ | 26.5 |
| #44 | LiFePO$_4$ | LiV$_3$O$_8$ | 63.2 |
| #45 | LiMnO$_2$ | LiV$_3$O$_8$ | 50.5 |
| Reference Example | LiFePO$_4$ | LiMn$_2$O$_4$ | 41.9 |

As it is apparent from Table 6, it is understood that, compared to the respective lithium secondary batteries of #44 and 45, using LiV$_3$O$_8$ as the negative electrode active material, the respective lithium secondary batteries of #41 and #42, using LiV$_2$O$_4$ as the negative electrode active material, are such that their first time discharge capacities are large. Moreover, compared to the lithium secondary battery, using LiMn$_2$O$_4$ as the negative electrode active material, their first time discharge capacities are large considerably. Namely, it was possible to confirm that the lithium secondary batteries according to the present invention, using the lithium-vanadium composite oxide expressed by a composition formula LiV$_2$O$_4$ for the negative electrode active material, are aqueous lithium secondary batteries of large capacities. Note that the aqueous lithium secondary battery of #43 become one whose first time discharge capacity was small. This is because the lithium-nickel composite oxide was used for the positive electrode active material, and it is believed that capacity could not be taken out too much within the aforementioned voltage range. Therefore, as for the positive electrode active material used in the lithium secondary battery according to the present invention, it is possible to say that the hexagonal layered rocksalt structure lithium-manganese composite oxide, expressed by a composition formula LiMnO$_2$, and the olivine structure lithium-iron composite phosphorus oxide, expressed by a composition formula LiFePO$_4$, are suitable.

Figure 13:
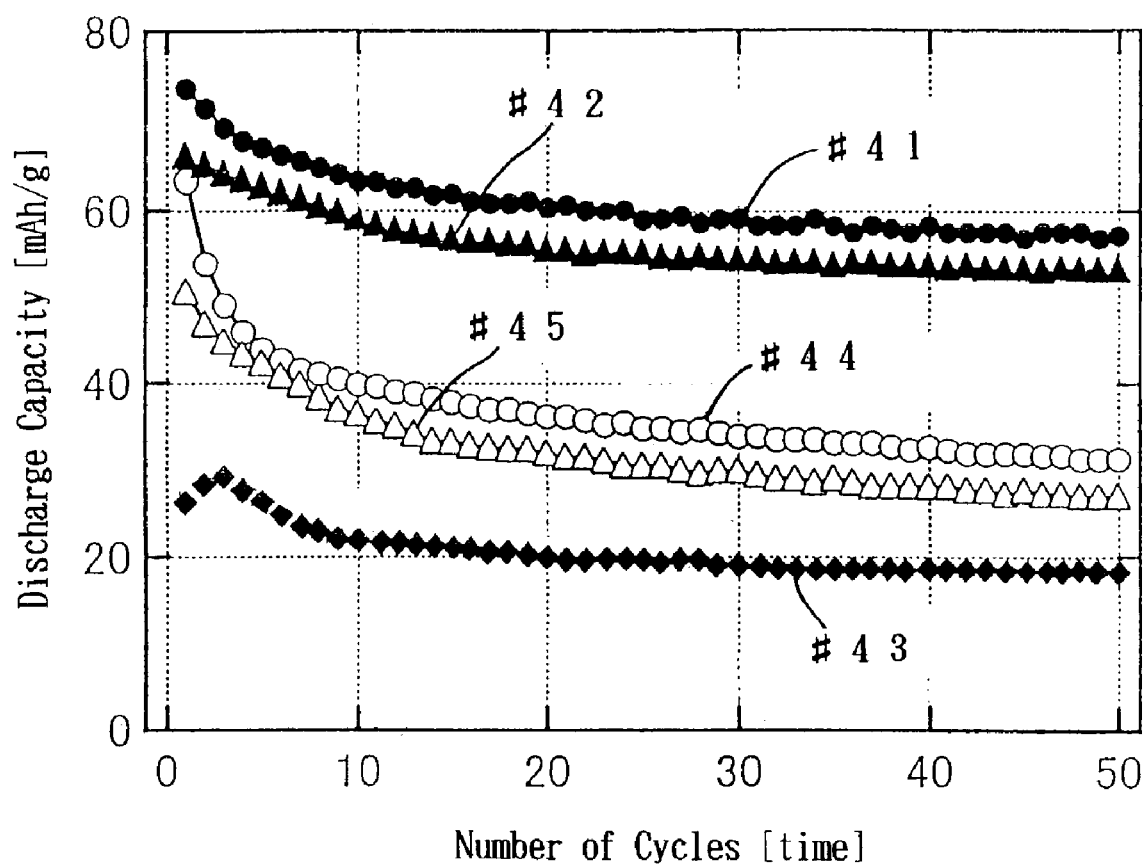
FIG. 13 illustrates discharge capacities per unit weight of positive electrode active materials on secondary batteries of #41 through #45 in respective cycles at 60° C.

Moreover, as another result of the aforementioned charge-discharge cycle test, in FIG. 13, there are illustrated the discharge capacities per unit weight of the positive electrode active materials at the respective cycles in the charge-discharge cycle test on the respective secondary batteries of #41 through #45. As it is apparent from FIG. 13, it is understood that the respective lithium secondary batteries of #41 and #42, using LiV$_2$O$_4$ as the negative electrode active material, maintain, compared to the respective lithium secondary batteries of #44 and #45, using LiV$_3$O$_8$ as the negative electrode active material, larger capacities even in case of repeating the cycle. From this result, it was possible to confirm that the lithium secondary batteries according to the present invention, using the lithium-vanadium composite oxide expressed by a composition formula LiV$_2$O$_4$ for the negative electrode active material, are good aqueous lithium secondary batteries in terms of cycle characteristic.

INDUSTRIAL APPLICABILITY

The lithium secondary battery according to the present invention is an aqueous lithium secondary battery which uses an aqueous solution for the electrolytic solution, and makes a secondary battery, which is less expensive, whose safety is extremely high and which is of high power as well as large capacity, by using a suitable positive-electrode active-material raw material. Moreover, even after repeating charge-discharge, it makes a secondary battery whose capacity decrement is small, and which is good in terms of cycle characteristic, in particular, cycle characteristic at high temperatures.

Such a lithium secondary battery according to the present invention can be used widely, in addition to the fields of communication appliances and information-related appliances, as an electric source and the like for electric automobiles whose developments have been urged because of the environmental problems as well as the resource problems. In particular, it is useful as an electric source for powering automobiles and so forth which are expected to be used under severe conditions such as the service temperatures.

The invention claimed is:

1. A lithium secondary battery comprising:
   a positive electrode formed by binding a positive-electrode raw-material mixture including a positive electrode active material,
   a negative electrode formed by binding a negative-electrode raw-material mixture including a negative electrode active material, and
   an electrolytic solution comprising an aqueous solution in which a lithium salt is dissolved, wherein
   said positive electrode active material is an olivine structure lithium-iron composite phosphorus oxide whose basic composition is LiFePO$_4$, and wherein
   said battery is adapted for impregnating said positive electrode and said negative electrode with said electrolytic solution.

2. The lithium secondary battery set forth in claim 1, wherein said negative electrode active material comprises a lithium-vanadium composite oxide.

3. The lithium secondary battery set forth in claim 1, wherein said negative electrode active material comprises a transition metal chalcogenide.

4. A lithium secondary battery comprising:
a positive electrode formed by binding a positive-electrode raw-material mixture including a positive electrode active material,
a negative electrode formed by binding a negative-electrode raw-material mixture including a negative electrode active material, and
an electrolytic solution comprising an aqueous solution in which a lithium salt is dissolved, wherein
said positive electrode active material comprises (1) a layered structure lithium-manganese composite oxide whose basic composition is $LiMnO_2$, (2) an olivine structure lithium-iron composite phosphorus oxide whose basic composition is $LiFePO_4$, or a combination of (1) and (2), wherein said negative electrode active material comprises a lithium-vanadium composite oxide, and wherein
said battery is adapted for impregnating said positive electrode and said negative electrode with said electrolytic solution.

5. The lithium secondary battery set forth in claim 4, wherein said lithium-vanadium composite oxide has, in an X-ray diffraction pattern by means of CuKα ray, the highest intensity peak at $2\theta=13.9°\pm1°$ (θ being diffraction angle), and the intensity of the peak is 5 times or more compared to the intensities of all of the other peaks.

6. The lithium secondary battery set forth in claim 5, wherein said lithium-vanadium composite oxide is expressed by a composition formula $Li_xV_3O_y$ ($1.2<x<1.6$; $7.5\leq y\leq 8.25$).

7. The lithium secondary battery set forth in claim 4, wherein said lithium-vanadium composite oxide is a spinel structure lithium-vanadium composite oxide whose basic composition is $LiV_2O_4$.

8. The lithium secondary battery set forth in claim 4, wherein said lithium-manganese composite oxide includes a lithium-manganese composite oxide (space group C2/m) having an orthorhombic layered structure or a lithium-manganese composite oxide (space group Pmnm) having a monoclinic zigzag layered structure.

9. A lithium secondary battery comprising:
a positive electrode formed by binding a positive-electrode raw-material mixture including a positive electrode active material.
a negative electrode formed by binding a negative-electrode raw-material mixture including a negative electrode active material, and
an electrolytic solution comprising an aqueous solution in which a lithium salt is dissolved, wherein
said positive electrode active material comprises (1) a layered structure lithium-manganese composite oxide whose basic composition is $LiMnO_2$, (2) an olivine structure lithium-iron composite phosphorus oxide whose basic composition is $LiFePO_4$, or a combination of (1) and (2), wherein said negative electrode active material comprises a transition metal chalcogenide, and wherein
said battery is adapted for impregnating said positive electrode and said negative electrode with said electrolytic solution.

10. The lithium secondary battery set forth in claim 9, wherein said transition metal chalcogenide is at least one selected from the group consisting of $TiS_2$, $MOS_2$, $NbS_2$ and $VS_2$.

11. The lithium secondary battery set forth in claim 9 wherein said lithium-manganese composite oxide includes a lithium-manganese composite oxide (space group C2/m) having an orthorhombic layered structure or a lithium-manganese composite oxide (space group Pmnm) having a monoclinic zigzag layered structure.

* * * * *